US012803595B2

(12) United States Patent
Leung et al.

(10) Patent No.: US 12,803,595 B2
(45) Date of Patent: *Nov. 17, 2026

(54) RADIO FREQUENCY FRONT END WITH POST AMPLIFIER RECEIVE FILTER

(71) Applicant: Skyworks Solutions, Inc., Irvine, CA (US)

(72) Inventors: John Chi-Shuen Leung, Foothill Ranch, CA (US); David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 18/599,082

(22) Filed: Mar. 7, 2024

(65) Prior Publication Data

US 2024/0305317 A1 Sep. 12, 2024

Related U.S. Application Data

(60) Provisional application No. 63/450,930, filed on Mar. 8, 2023, provisional application No. 63/450,941, filed on Mar. 8, 2023.

(51) Int. Cl.

| | |
|---|---|
| ***H04B 1/00*** | (2006.01) |
| ***H04B 1/707*** | (2011.01) |
| *H04L 5/14* | (2006.01) |

(52) U.S. Cl.

CPC ....... *H04B 1/0057* (2013.01); *H04B 1/70712* (2013.01); *H04L 5/14* (2013.01)

(58) Field of Classification Search

CPC .. H04B 1/0057; H04B 1/70712; H04B 1/006; H04B 1/525; H04L 5/14

USPC ......... 455/552.1, 550.1, 432.1, 432.2, 432.3, 455/433

See application file for complete search history.

(56) References Cited

U.S. PATENT DOCUMENTS 7,088,985 B2 8/2006 Ismail
7,676,243 B2 3/2010 Leinonen et al.
8,710,812 B1 * 4/2014 Edwards .................. G05F 3/30 323/907
9,397,721 B2 7/2016 Pehlke
9,496,913 B2 11/2016 King et al.
9,621,327 B2 4/2017 Chang et al.
9,948,348 B2 4/2018 Nohra et al.
10,009,054 B2 6/2018 Wloczysiak
10,014,889 B2 7/2018 King et al.
10,069,615 B2 9/2018 Chang et al.
10,075,199 B2 9/2018 King et al.
10,103,772 B2 10/2018 Pehlke et al.
10,135,469 B2 11/2018 Chang et al.
10,256,851 B2 4/2019 Pehlke et al.
10,257,119 B2 4/2019 Wloczysiak et al.

(Continued)

*Primary Examiner* — Juan A Torres

(74) *Attorney, Agent, or Firm* — VIA LLP

(57) ABSTRACT

A radio frequency front-end system includes a frequency-division duplexing (FDD) duplexer. A receive amplifier amplifies a filtered receive signal output by the duplexer to output an amplified receive signal. The receive amplifier includes a first amplified output and a second amplified output. A first noise filter connected to the first amplified output has a stopband corresponding to the transmit channel. A switch selectively outputs either 1) the receive signal filtered by the noise filter or 2) the second amplified output.

20 Claims, 22 Drawing Sheets

(56) References Cited

U.S. PATENT DOCUMENTS 10,447,317 B2 10/2019 Chang et al.
10,447,322 B2 10/2019 Wloczysiak
10,587,291 B2 3/2020 Pehlke et al.
10,637,555 B2 4/2020 Wloczysiak
10,985,796 B2 4/2021 Pehlke
11,038,543 B2 6/2021 Chang et al.
11,064,491 B2 7/2021 Balteanu
11,336,325 B2 5/2022 Pehlke
11,349,504 B2 5/2022 Pehlke
11,405,059 B2 8/2022 Pehlke
11,558,079 B2 1/2023 Raghavan et al.
11,601,144 B2 3/2023 Loh et al.
11,646,757 B2 5/2023 Pehlke
11,671,122 B2 6/2023 Loh et al.
11,709,201 B2 7/2023 Peixoto et al.
11,916,577 B2 2/2024 Pehlke
11,973,523 B2 4/2024 King et al.
12,055,585 B2 8/2024 Godoy et al.
12,057,866 B2 8/2024 King et al.
2004/0052272 A1 3/2004 Frank
2004/0266378 A1 12/2004 Fukamachi et al.
2006/0135195 A1* 6/2006 Leinonen ............. H04B 1/0057 455/78
2007/0082622 A1* 4/2007 Leinonen ................. H04B 1/40 455/132
2013/0230026 A1* 9/2013 Kwon ................... H04W 76/14 370/336
2014/0266510 A1 9/2014 Silver et al.
2015/0229463 A1* 8/2015 Oh ........................... H04B 1/48 370/278
2016/0044677 A1 2/2016 King et al.
2016/0112072 A1 4/2016 Bauder
2018/0048345 A1* 2/2018 Pehlke ...................... H03F 3/72
2018/0062582 A1 3/2018 Pehlivanoglu
2018/0131500 A1 5/2018 Pehlke
2018/0167094 A1* 6/2018 Aramata .................. H04B 1/52
2019/0181907 A1 6/2019 Pfann et al.
2020/0067549 A1* 2/2020 Raghavan .............. H04B 1/525
2020/0067606 A1* 2/2020 Raghavan .............. H04B 1/406
2020/0162114 A1 5/2020 King et al.
2020/0313701 A1* 10/2020 Xiong .................... H04B 1/006
2020/0412403 A1* 12/2020 Pehlke ...................... H04L 5/14
2021/0028813 A1* 1/2021 Pehlke ................... H04B 1/525
2021/0218434 A1 7/2021 Pehlke
2022/0069775 A1 3/2022 Balteanu et al.
2023/0105554 A1 4/2023 Pehlke
2023/0105730 A1 4/2023 Pehlke
2023/0144780 A1 5/2023 Pehlke
2023/0269060 A1 8/2023 Leung
2023/0308119 A1 9/2023 Pehlke
2024/0097756 A1 3/2024 Pehlke
2024/0106475 A1 3/2024 Pehlke
2024/0106476 A1 3/2024 Pehlke
2024/0120953 A1 4/2024 Raghavan et al.
2024/0146339 A1 5/2024 Pehlke
2024/0146341 A1 5/2024 Pehlke
2024/0223226 A1 7/2024 Pehlke
2024/0223231 A1 7/2024 Pehlke et al.
2024/0235591 A1 7/2024 Poulin
2024/0243772 A1 7/2024 Pehlke
2024/0267064 A1 8/2024 Leung et al.
2024/0305316 A1* 9/2024 Leung .................... H04B 1/525

* cited by examiner

RADIO FREQUENCY FRONT END WITH POST AMPLIFIER RECEIVE FILTER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

Embodiments of the invention relate to electronic systems, and in particular, to radio frequency (RF) electronics.

Description of Related Technology

RF systems can be used for transmitting and/or receiving signals of a wide range of frequencies. For example, an RF system can be used to wirelessly transmit and receive RF signals in a frequency range of about 30 kilohertz (kHz) to 300 gigahertz (GHz), such as in the range of about 450 megahertz (MHz) to about 7 GHz for certain communications standards.

Examples of RF systems include, but are not limited to, mobile phones, tablets, base stations, network access points, customer-premises equipment (CPE), laptops, and wearable electronics.

SUMMARY

In some aspects, the techniques described herein relate to a radio frequency front-end system including: a duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band; a receive amplifier configured to amplify the filtered receive signal output by the downlink filter to output an amplified receive signal; and a post-amplifier receive circuit including a first noise filter having a stopband corresponding to the transmit channel, the post-amplifier receive circuit configured to selectively output either the amplified receive signal or a filtered version of the amplified receive signal filtered by the first noise filter.

In some aspects, the techniques described herein relate to a front-end system wherein the post-amplifier receive circuit includes one or more switches controllable to selectively connect the first noise filter into an output path of the receive circuit.

In some aspects, the techniques described herein relate to a front-end system wherein the post-amplifier receive circuit includes a pair of single-throw, multi-pole switches configured to selectively connect the first noise filter between the output of the receive amplifier and the output of the receive path circuit.

In some aspects, the techniques described herein relate to a front-end system wherein the first noise filter is a notch filter or bandstop filter.

In some aspects, the techniques described herein relate to a front-end system wherein the first noise filter is a bulk acoustic wave (BAW) filter, a surface acoustic wave (SAW) filter, a Temperature-compensated SAW (TC-SAW) filter, or an advanced thin-film TC-SAW filter to provide at least 30 dB of noise rejection.

In some aspects, the techniques described herein relate to a front-end system wherein the first noise filter is a dual-mode surface acoustic wave filter.

In some aspects, the techniques described herein relate to a front-end system wherein an output of the post-amplifier receive circuit is coupled to an input port of a radio frequency integrated circuit.

In some aspects, the techniques described herein relate to a front-end system wherein the radio-frequency front-end system is implemented in a packaged module, and the radio frequency integrated circuit is a transceiver.

In some aspects, the techniques described herein relate to a front-end system further including a transmit power amplifier configured to amplify a radio frequency transmit signal to generate the amplified transmit signal.

In some aspects, the techniques described herein relate to a front-end system wherein the post-amplifier receive circuit further includes a second noise filter, the post-amplifier receive circuit configured to selectively output either the amplified receive signal, the filtered version of the amplified receive signal filtered by the first noise filter, or a second amplified receive signal filtered by the second noise filter.

In some aspects, the techniques described herein relate to a front-end system wherein the second amplified receive signal is the amplified receive signal output by the receive amplifier.

In some aspects, the techniques described herein relate to a front-end system wherein the second amplified receive signal is an amplified receive signal output by a second receive amplifier.

In some aspects, the techniques described herein relate to a front-end system wherein the second noise filter has a stop band corresponding to a transmit channel of a second frequency duplex communication band.

In some aspects, the techniques described herein relate to a mobile device including: an antenna; a radio frequency integrated circuit; and a radio frequency module including a duplexer, a receive amplifier, and a post-amplifier receive circuit, the duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band, the receive amplifier configured to amplify the filtered receive signal output by the downlink filter to output an amplified receive signal, and the post-amplifier receive circuit including a first noise filter having a stopband corresponding to the transmit channel, the post-amplifier receive circuit configured to selectively output to the radio frequency integrated circuit either the amplified receive signal or a filtered version of the amplified receive signal filtered by the first noise filter.

In some aspects, the techniques described herein relate to a mobile device wherein the post-amplifier receive circuit includes one or more switches controllable to selectively connect the first noise filter into an output path of the receive circuit.

In some aspects, the techniques described herein relate to a mobile device wherein the post-amplifier receive circuit includes a pair of single-throw, multi-pole switches configured to selectively connect the first noise filter between the output of the receive amplifier and the output of the receive path circuit.

In some aspects, the techniques described herein relate to a mobile device wherein the first noise filter is a notch filter.

In some aspects, the techniques described herein relate to a mobile device wherein the first noise filter is a bulk acoustic wave (BAW) filter, a surface acoustic wave (SAW) filter, a Temperature-compensated SAW (TC-SAW) filter, or an advanced thin-film TC-SAW filter to provide at least 30 dB of noise rejection.

In some aspects, the techniques described herein relate to a mobile device wherein the first noise filter is a dual-mode surface acoustic wave filter.

In some aspects, the techniques described herein relate to a mobile device wherein the radio-frequency module is implemented in a packaged module, and the radio frequency integrated circuit implements a transceiver.

In some aspects, the techniques described herein relate to a mobile device further including a transmit power amplifier configured to amplify a radio frequency transmit signal to generate the amplified transmit signal.

In some aspects, the techniques described herein relate to a mobile device wherein the post-amplifier receive circuit further includes a second noise filter, the post-amplifier receive circuit configured to selectively output either the amplified receive signal, the filtered version of the amplified receive signal filtered by the first noise filter, or a second amplified receive signal filtered by the second noise filter.

In some aspects, the techniques described herein relate to a mobile device wherein the second amplified receive signal is the amplified receive signal output by the receive amplifier.

In some aspects, the techniques described herein relate to a mobile device wherein the second amplified receive signal is an amplified receive signal output by a second receive amplifier.

In some aspects, the techniques described herein relate to a mobile device wherein the second noise filter has a stop band corresponding to a transmit channel of a second frequency duplex communication band.

In some aspects, the techniques described herein relate to a mobile device including: an antenna; a transceiver; and a front end including a duplexer, a receive amplifier, and a post-amplifier receive circuit, the duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band, the receive amplifier configured to amplify the filtered receive signal output by the downlink filter to output an amplified receive signal, and the post-amplifier receive circuit including a first noise filter having a stopband corresponding to the transmit channel, the post-amplifier receive circuit configured to selectively output to the transceiver either the amplified receive signal or a filtered version of the amplified receive signal filtered by the first noise filter.

In some aspects, the techniques described herein relate to a radio frequency front-end system including: a duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band; a receive amplifier configured to amplify the filtered receive signal output by the downlink filter to output an amplified receive signal, the receive amplifier including a first amplified output and a second amplified output; and a first noise filter connected to the first amplified output, having a stopband corresponding to the transmit channel, and configured to output a filtered receive signal; and a switch configured to selectively output either the filtered receive signal or the second amplified output.

In some aspects, the techniques described herein relate to a front-end system wherein the receive amplifier includes a common transistor receiving the filtered receive signal, a second transistor connected between the common transistor and the first amplified output of the receive amplifier, and a third transistor connected between the common transistor and the second amplified output of the receive amplifier.

In some aspects, the techniques described herein relate to a front-end system wherein the second transistor is biased by a first voltage and the third transistor is biased by a second voltage.

In some aspects, the techniques described herein relate to a front-end system wherein the switch is a single-throw, multi-pole switch.

In some aspects, the techniques described herein relate to a front-end system wherein the first noise filter is a notch filter.

In some aspects, the techniques described herein relate to a front-end system wherein the first noise filter is a bulk acoustic wave (BAW) filter, a surface acoustic wave (SAW) filter, a Temperature-compensated SAW (TC-SAW) filter, or an advanced thin-film TC-SAW filter to provide at least 30 dB of noise rejection.

In some aspects, the techniques described herein relate to a front-end system wherein the first noise filter is a dual-mode surface acoustic wave filter.

In some aspects, the techniques described herein relate to a front-end system wherein an output of the switch is coupled to an input port of a radio frequency integrated circuit.

In some aspects, the techniques described herein relate to a front-end system wherein the radio-frequency front-end system is implemented in a packaged module, and the radio frequency integrated circuit is a transceiver.

In some aspects, the techniques described herein relate to a front-end system further including a transmit power amplifier configured to amplify a radio frequency transmit signal to generate the amplified transmit signal.

In some aspects, the techniques described herein relate to a front-end system wherein the receive amplifier includes a third amplified output, the front-end system further includes a second noise filter connected to the third amplified output and configured to output a second filtered receive signal, and the switch configured to selectively output either the filtered receive signal, the second filtered receive signal, or the second amplified output.

In some aspects, the techniques described herein relate to a front-end system wherein the second noise filter has a stop band corresponding to a transmit channel of a second frequency duplex communication band.

In some aspects, the techniques described herein relate to a mobile device including: an antenna; a radio frequency integrated circuit; and a radio frequency module including a duplexer, a receive amplifier, a first noise filter, and a switch, the duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band, the receive amplifier configured to amplify the filtered receive signal output by the downlink filter to output an amplified receive signal, the receive amplifier including a first amplified output and a second amplified output, the first noise filter connected to the first amplified output, having a stopband corresponding to the transmit channel, and configured to output a filtered receive signal, and the switch configured to selectively output either the filtered receive signal or the second amplified output.

In some aspects, the techniques described herein relate to a mobile device wherein the receive amplifier includes a common transistor receiving the filtered receive signal, a second transistor connected between the common transistor and the first amplified output of the receive amplifier, and a third transistor connected between the common transistor and the second amplified output of the receive amplifier.

In some aspects, the techniques described herein relate to a mobile device wherein the second transistor is biased by a first voltage and the third transistor is biased by a second voltage.

In some aspects, the techniques described herein relate to a mobile device wherein the switch is a single-throw, multi-pole switch.

In some aspects, the techniques described herein relate to a mobile device wherein the first noise filter is a notch filter.

In some aspects, the techniques described herein relate to a mobile device wherein the first noise filter is a bulk acoustic wave (BAW) filter, a surface acoustic wave (SAW) filter, a Temperature-compensated SAW (TC-SAW) filter, or an advanced thin-film TC-SAW filter to provide at least 30 dB of noise rejection.

In some aspects, the techniques described herein relate to.

In some aspects, the techniques described herein relate to a mobile device wherein the first noise filter is a dual-mode surface acoustic wave filter.

In some aspects, the techniques described herein relate to a mobile device wherein an output of the switch is coupled to an input port of a radio frequency integrated circuit.

In some aspects, the techniques described herein relate to a mobile device wherein the radio-frequency module is implemented in a packaged module, and the radio frequency integrated circuit is a transceiver.

In some aspects, the techniques described herein relate to a mobile device further including a transmit power amplifier configured to amplify a radio frequency transmit signal to generate the amplified transmit signal.

In some aspects, the techniques described herein relate to a mobile device wherein the receive amplifier includes a third amplified output, radio frequency module further includes a second noise filter connected to the third amplified output and configured to output a second filtered receive signal, and the switch configured to selectively output either the filtered receive signal, the second filtered receive signal, or the second amplified output.

In some aspects, the techniques described herein relate to a mobile device wherein the second noise filter has a stop band corresponding to a transmit channel of a second frequency duplex communication band.

In some aspects, the techniques described herein relate to a mobile device including: an antenna; a transceiver; and a front end including a duplexer, a receive amplifier, a first noise filter, and a switch, the duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band, the receive amplifier configured to amplify the filtered receive signal output by the downlink filter to output an amplified receive signal, the receive amplifier including a first amplified output and a second amplified output, the first noise filter connected to the first amplified output, having a stopband corresponding to the transmit channel, and configured to output a filtered receive signal, and the switch configured to selectively output either the filtered receive signal or the second amplified output.

In some aspects, the techniques described herein relate to a radio frequency front-end system including: a duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band; a receive amplifier configured to amplify the filtered receive signal output by the downlink filter to output an amplified receive signal; and a post-amplifier receive circuit including a first noise filter having a stopband corresponding to the transmit channel, the post-amplifier receive circuit configured to selectively output either the amplified receive signal or a filtered version of the amplified receive signal filtered by the first noise filter.

In some aspects, the techniques described herein relate to a front-end system wherein the post-amplifier receive circuit includes one or more switches controllable to selectively connect the first noise filter into an output path of the receive circuit.

In some aspects, the techniques described herein relate to a front-end system wherein the post-amplifier receive circuit includes a pair of single-throw, multi-pole switches configured to selectively connect the first noise filter between the output of the receive amplifier and the output of the receive path circuit.

In some aspects, the techniques described herein relate to a front-end system wherein the first noise filter is a notch filter.

In some aspects, the techniques described herein relate to a front-end system wherein the first noise filter of the downlink filter circuit is a bulk acoustic wave (BAW) or a surface acoustic wave (SAW) filter configured to provide at least 30 dB of noise rejection.

In some aspects, the techniques described herein relate to a front-end system wherein the first noise filter is a dual-mode surface acoustic wave filter.

In some aspects, the techniques described herein relate to a front-end system wherein an output of the post-amplifier receive circuit is coupled to an input port of a radio frequency integrated circuit.

In some aspects, the techniques described herein relate to a front-end system wherein the radio-frequency front-end system is implemented in a packaged module, and the radio frequency integrated circuit is a transceiver.

In some aspects, the techniques described herein relate to a front-end system further including a transmit power amplifier configured to amplify a radio frequency transmit signal to generate the amplified transmit signal.

In some aspects, the techniques described herein relate to a front-end system wherein the post-amplifier receive circuit further includes a second noise filter, the post-amplifier receive circuit configured to selectively output either the amplified receive signal, the filtered version of the amplified receive signal filtered by the first noise filter, or a second amplified receive signal filtered by the second noise filter.

In some aspects, the techniques described herein relate to a front-end system wherein the second amplified receive signal is the amplified receive signal output by the receive amplifier.

In some aspects, the techniques described herein relate to a front-end system wherein the second amplified receive signal is an amplified receive signal output by a second receive amplifier.

In some aspects, the techniques described herein relate to a front-end system wherein the second noise filter has a stop band corresponding to a transmit channel of a second frequency duplex communication band.

In some aspects, the techniques described herein relate to a mobile device including: an antenna; a radio frequency integrated circuit; and a radio frequency module including a duplexer, a receive amplifier, and a post-amplifier receive circuit, the duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band, the receive amplifier configured to amplify the filtered receive signal output by the downlink filter to output an amplified receive signal, and the post-amplifier receive circuit including a first noise filter having a stopband corresponding to the transmit channel, the post-amplifier receive circuit configured to selectively output to the radio frequency integrated circuit either the amplified receive signal or a filtered version of the amplified receive signal filtered by the first noise filter.

In some aspects, the techniques described herein relate to a mobile device wherein the post-amplifier receive circuit includes one or more switches controllable to selectively connect the first noise filter into an output path of the receive circuit.

In some aspects, the techniques described herein relate to a mobile device wherein the post-amplifier receive circuit includes a pair of single-throw, multi-pole switches configured to selectively connect the first noise filter between the output of the receive amplifier and the output of the receive path circuit.

In some aspects, the techniques described herein relate to a mobile device wherein the first noise filter is a notch filter.

In some aspects, the techniques described herein relate to a mobile device wherein the first noise filter of the downlink filter circuit is a bulk acoustic wave (BAW) or a surface acoustic wave (SAW) filter configured to provide at least 30 dB of noise rejection.

In some aspects, the techniques described herein relate to a mobile device wherein the first noise filter is a dual-mode surface acoustic wave filter.

In some aspects, the techniques described herein relate to a mobile device wherein the radio-frequency module is implemented in a packaged module, and the radio frequency integrated circuit implements a transceiver.

In some aspects, the techniques described herein relate to a mobile device further including a transmit power amplifier configured to amplify a radio frequency transmit signal to generate the amplified transmit signal.

In some aspects, the techniques described herein relate to a mobile device wherein the post-amplifier receive circuit further includes a second noise filter, the post-amplifier receive circuit configured to selectively output either the amplified receive signal, the filtered version of the amplified receive signal filtered by the first noise filter, or a second amplified receive signal filtered by the second noise filter.

In some aspects, the techniques described herein relate to a mobile device wherein the second amplified receive signal is the amplified receive signal output by the receive amplifier.

In some aspects, the techniques described herein relate to a mobile device wherein the second amplified receive signal is an amplified receive signal output by a second receive amplifier.

In some aspects, the techniques described herein relate to a mobile device wherein the second noise filter has a stop band corresponding to a transmit channel of a second frequency duplex communication band.

In some aspects, the techniques described herein relate to a mobile device including: an antenna; a transceiver; and a front end including a duplexer, a receive amplifier, and a post-amplifier receive circuit, the duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band, the receive amplifier configured to amplify the filtered receive signal output by the downlink filter to output an amplified receive signal, and the post-amplifier receive circuit including a first noise filter having a stopband corresponding to the transmit channel, the post-amplifier receive circuit configured to selectively output to the transceiver either the amplified receive signal or a filtered version of the amplified receive signal filtered by the first noise filter.

Claims Directed to Second Embodiment (FIGS. 7C-7D)

In some aspects, the techniques described herein relate to a radio frequency front-end system including: a duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band; a receive amplifier configured to amplify the filtered receive signal output by the downlink filter to output an amplified receive signal, the receive amplifier including a first amplified output and a second amplified output; and a first noise filter connected to the first amplified output, having a stopband corresponding to the transmit channel, and configured to output a filtered receive signal; and a switch configured to selectively output either the filtered receive signal or the second amplified output.

In some aspects, the techniques described herein relate to a front-end system wherein the receive amplifier includes a common transistor receiving the filtered receive signal, a second transistor connected between the common transistor and the first amplified output of the receive amplifier, and a third transistor connected between the common transistor and the second amplified output of the receive amplifier.

In some aspects, the techniques described herein relate to a front-end system wherein the second transistor is biased by a first voltage and the third transistor is biased by a second voltage.

In some aspects, the techniques described herein relate to a front-end system wherein the switch is a single-throw, multi-pole switch.

In some aspects, the techniques described herein relate to a front-end system wherein the first noise filter is a notch filter.

In some aspects, the techniques described herein relate to a front-end system wherein the first noise filter is a bulk acoustic wave (BAW) or a surface acoustic wave (SAW) filter configured to provide at least 30 dB of noise rejection.

In some aspects, the techniques described herein relate to a front-end system wherein the first noise filter is a dual-mode surface acoustic wave filter.

In some aspects, the techniques described herein relate to a front-end system wherein an output of the switch is coupled to an input port of a radio frequency integrated circuit.

In some aspects, the techniques described herein relate to a front-end system wherein the radio-frequency front-end system is implemented in a packaged module, and the radio frequency integrated circuit is a transceiver.

In some aspects, the techniques described herein relate to a front-end system further including a transmit power amplifier configured to amplify a radio frequency transmit signal to generate the amplified transmit signal.

In some aspects, the techniques described herein relate to a front-end system wherein the receive amplifier includes a third amplified output, the front-end system further includes a second noise filter connected to the third amplified output and configured to output a second filtered receive signal, and the switch configured to selectively output either the filtered receive signal, the second filtered receive signal, or the second amplified output.

In some aspects, the techniques described herein relate to a front-end system wherein the second noise filter has a stop band corresponding to a transmit channel of a second frequency duplex communication band.

In some aspects, the techniques described herein relate to a mobile device including: an antenna; a radio frequency integrated circuit; and a radio frequency module including a duplexer, a receive amplifier, a first noise filter, and a switch, the duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band, the receive amplifier configured to amplify the filtered receive signal output by the downlink filter to output an amplified receive signal, the receive amplifier including a first amplified output and a second amplified output, the first noise filter connected to the first amplified output, having a stopband corresponding to the transmit channel, and configured to output a filtered receive signal, and the switch configured to selectively output either the filtered receive signal or the second amplified output.

In some aspects, the techniques described herein relate to a mobile device wherein the receive amplifier includes a common transistor receiving the filtered receive signal, a second transistor connected between the common transistor and the first amplified output of the receive amplifier, and a third transistor connected between the common transistor and the second amplified output of the receive amplifier.

In some aspects, the techniques described herein relate to a mobile device wherein the second transistor is biased by a first voltage and the third transistor is biased by a second voltage.

In some aspects, the techniques described herein relate to a mobile device wherein the switch is a single-throw, multi-pole switch.

In some aspects, the techniques described herein relate to a mobile device wherein the first noise filter is a notch filter.

In some aspects, the techniques described herein relate to a mobile device wherein the first noise filter is a bulk acoustic wave (BAW) or a surface acoustic wave (SAW) filter configured to provide at least 30 dB of noise rejection.

In some aspects, the techniques described herein relate to a mobile device wherein the first noise filter is a dual-mode surface acoustic wave filter.

In some aspects, the techniques described herein relate to a mobile device wherein an output of the switch is coupled to an input port of a radio frequency integrated circuit.

In some aspects, the techniques described herein relate to a mobile device wherein the radio-frequency module is implemented in a packaged module, and the radio frequency integrated circuit is a transceiver.

In some aspects, the techniques described herein relate to a mobile device further including a transmit power amplifier configured to amplify a radio frequency transmit signal to generate the amplified transmit signal.

In some aspects, the techniques described herein relate to a mobile device wherein the receive amplifier includes a third amplified output, radio frequency module further includes a second noise filter connected to the third amplified output and configured to output a second filtered receive signal, and the switch configured to selectively output either the filtered receive signal, the second filtered receive signal, or the second amplified output.

In some aspects, the techniques described herein relate to a mobile device wherein the second noise filter has a stop band corresponding to a transmit channel of a second frequency duplex communication band.

In some aspects, the techniques described herein relate to a mobile device including: an antenna; a transceiver; and a front end including a duplexer, a receive amplifier, a first noise filter, and a switch, the duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band, the receive amplifier configured to amplify the filtered receive signal output by the downlink filter to output an amplified receive signal, the receive amplifier including a first amplified output and a second amplified output, the first noise filter connected to the first amplified output, having a stopband corresponding to the transmit channel, and configured to output a filtered receive signal, and the switch configured to selectively output either the filtered receive signal or the second amplified output.

In one aspect, the techniques described herein relate to a mobile device including: a first antenna; a radio frequency integrated circuit; and a radio frequency front-end module electrically coupled to the first antenna and the radio frequency integrated circuit, the radio frequency front-end module including a radio frequency transmit path circuit, a radio frequency receive path circuit, and a configurable receive filter circuit in series with the receive path circuit configured to selectively filter radio frequency noise from the receive path circuit.

In another aspect, the techniques described herein relate to a mobile device wherein the radio frequency receive path circuit includes a low-noise amplifier (LNA) and a single-throw, multi-pole (SPMT) switch in series with a radio frequency duplexer.

In yet another aspect, the techniques described herein relate to a mobile device wherein the configurable receive filter circuit is a post-LNA circuit configured to filter radio frequency noise from an output of the low-noise amplifier.

In some aspects, the techniques described herein relate to a mobile device wherein the configurable receive filter circuit includes a radio frequency filter and a pair of single-throw, multi-pole switches configured to selectively connect the filter between the output of the low-noise amplifier and an output of the receive path circuit.

In some aspects, the techniques described herein relate to a mobile device wherein the radio frequency filter of the receive filter circuit is a notch filter having a stopband corresponding to a range of frequencies associated with transmissions by the transmit path circuit or crossover leakage of the front-end module.

In some aspects, the techniques described herein relate to a mobile device wherein the radio frequency filter of the receive filter circuit is a bulk acoustic wave (BAW) or a surface acoustic wave (SAW) filter configured to provide at least 30 dB of noise rejection.

In some aspects, the techniques described herein relate to a mobile device wherein the radio frequency integrated circuit is a Complementary Metal-Oxide-Semiconductor (CMOS) integrated circuit.

In some aspects, the techniques described herein relate to a mobile device wherein the radio frequency transmit path circuit includes a power amplifier (PA) and a single-throw, multi-pole (SPMT) switch in series with the radio frequency duplexer.

In some aspects, the techniques described herein relate to a mobile device wherein the radio frequency transmit path circuit and the radio frequency receive path circuit are both connected to the first antenna by a pair of filters of the radio frequency duplexer.

In some aspects, the techniques described herein relate to a mobile device wherein a first filter of the radio frequency duplexer is a band-pass filter having a passband centered on a transmission band of the transmit path circuit, and a second filter of the radio frequency duplexer is a band-pass filter having a passband centered on a receive band of the receive path circuit.

In some aspects, the techniques described herein relate to a front-end system including: a radio frequency transmit path circuit, a radio frequency receive path circuit, and a configurable receive filter circuit in series with the receive path circuit configured to selectively filter radio frequency noise from the receive path circuit.

In some aspects, the techniques described herein relate to a front-end system wherein the radio frequency receive path circuit includes a low-noise amplifier (LNA) and a single-throw, multi-pole (SPMT) switch in series with a radio frequency duplexer.

In some aspects, the techniques described herein relate to a front-end system wherein the configurable receive filter circuit is a post-LNA circuit configured to filter radio frequency noise from an output of the low-noise amplifier.

In some aspects, the techniques described herein relate to a front-end system wherein the configurable receive filter circuit includes a radio frequency filter and a pair of single-throw, multi-pole switches configured to selectively connect the filter between the output of the low-noise amplifier and an output of the receive path circuit.

In some aspects, the techniques described herein relate to a front-end system wherein the radio frequency filter of the receive filter circuit is a notch filter having a stopband corresponding to a range of frequencies associated with transmissions by the transmit path circuit or crossover leakage of the front-end system.

In some aspects, the techniques described herein relate to a front-end system wherein the radio frequency filter of the receive filter circuit is a bulk acoustic wave (BAW) or a surface acoustic wave (SAW) filter configured to provide at least 30 dB of noise rejection.

In some aspects, the techniques described herein relate to a front-end system wherein the output of the receive path circuit is coupled to a Complementary Metal-Oxide-Semiconductor (CMOS) radio frequency integrated circuit.

In some aspects, the techniques described herein relate to a front-end system wherein the radio frequency transmit path circuit includes a power amplifier (PA) and a single-throw, multi-pole (SPMT) switch in series with the radio frequency duplexer.

In some aspects, the techniques described herein relate to a front-end system wherein the radio frequency transmit path circuit and the radio frequency receive path circuit are both connected to a first antenna by a pair of filters of the radio frequency duplexer.

In some aspects, the techniques described herein relate to a front-end system wherein a first filter of the radio frequency duplexer is a band-pass filter having a passband centered on a transmission band of the transmit path circuit, and a second filter of the radio frequency duplexer is a band-pass filter having a passband centered on a receive band of the receive path circuit.

DETAILED DESCRIPTION OF CERTAIN EMBODIMENTS

Figure 1:
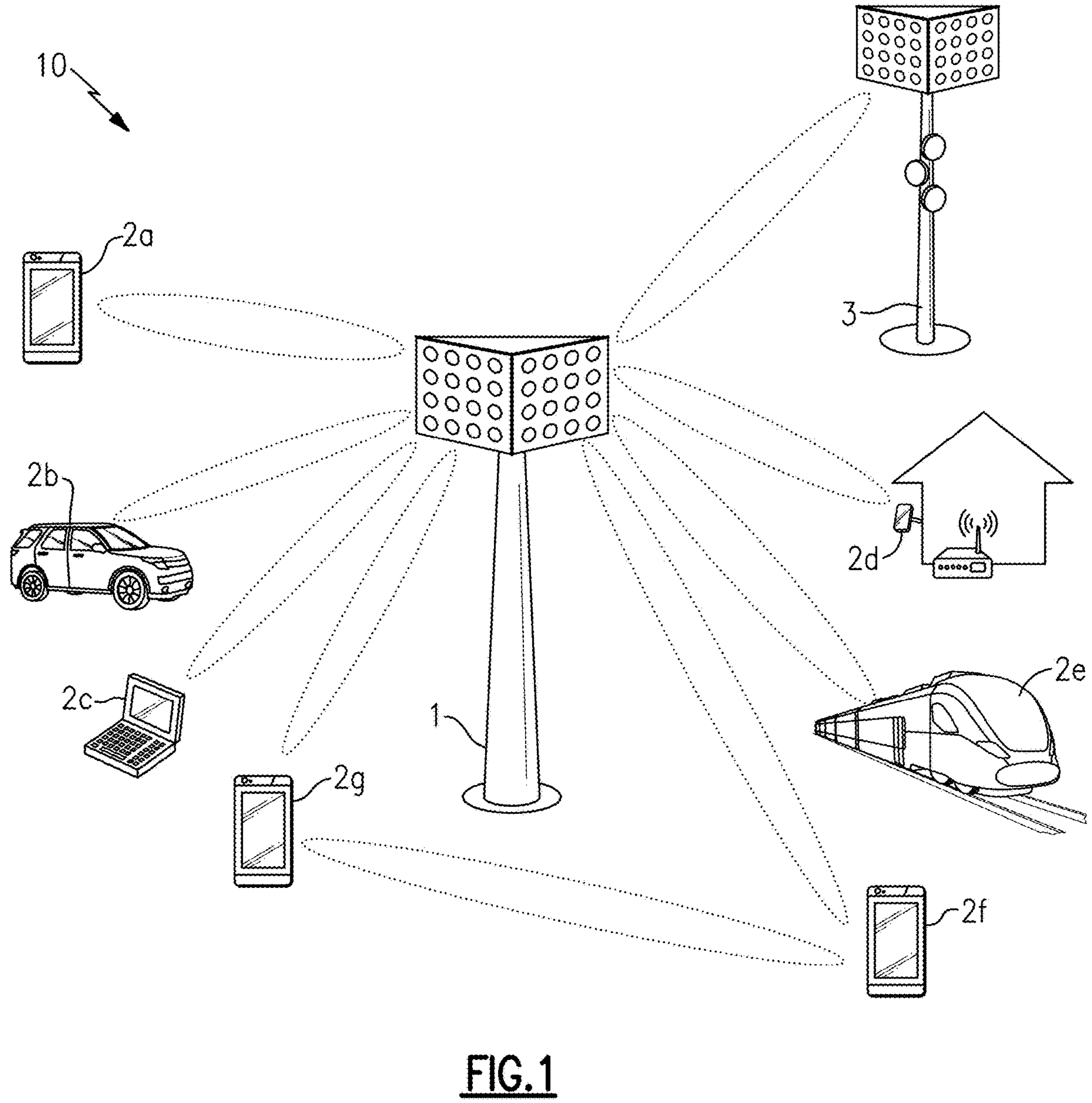
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IoT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2*a*, a wireless-connected car 2*b*, a laptop 2*c*, a stationary wireless device 2*d*, a wireless-connected train 2*e*, a second mobile device 2*f*, and a third mobile device 2*g*.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as Wi-Fi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and Wi-Fi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed Wi-Fi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2*g* and mobile device 2*f*).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

In certain implementations, the communication network 10 supports supplementary uplink (SUL) and/or supplementary downlink (SDL). For example, when channel conditions are good, the communication network 10 can direct a particular UE to transmit using an original uplink frequency, while when channel condition is poor (for instance, below a certain criteria) the communication network 10 can direct the UE to transmit using a supplementary uplink frequency that is lower than the original uplink frequency. Since cell coverage increases with lower frequency, communication range and/or signal-to-noise ratio (SNR) can be increased using SUL. Likewise, SDL can be used to transmit using an original downlink frequency when channel conditions are good, and to transmit using a supplementary downlink frequency when channel conditions are poor.

Figure 2A:
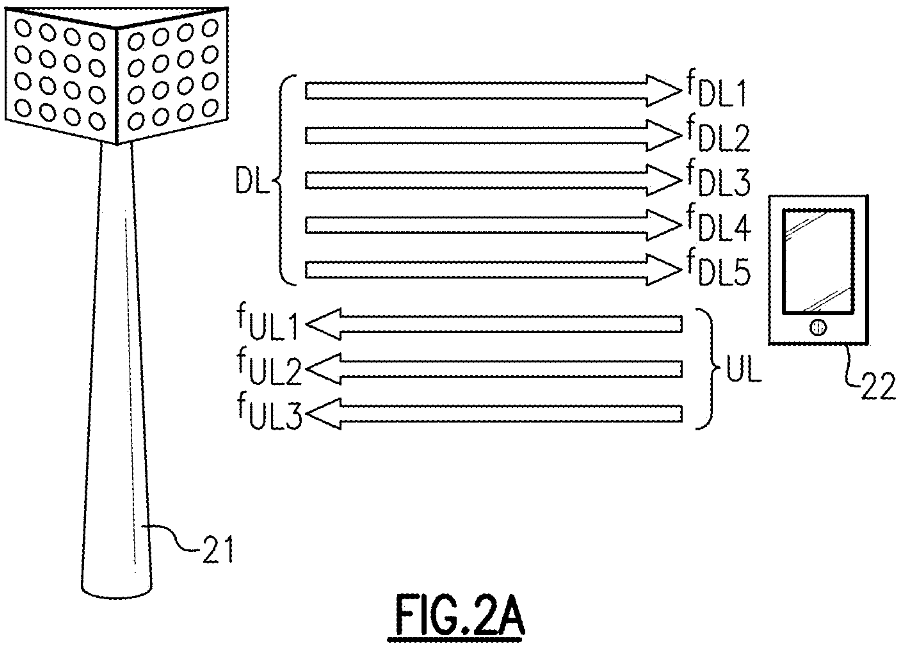
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
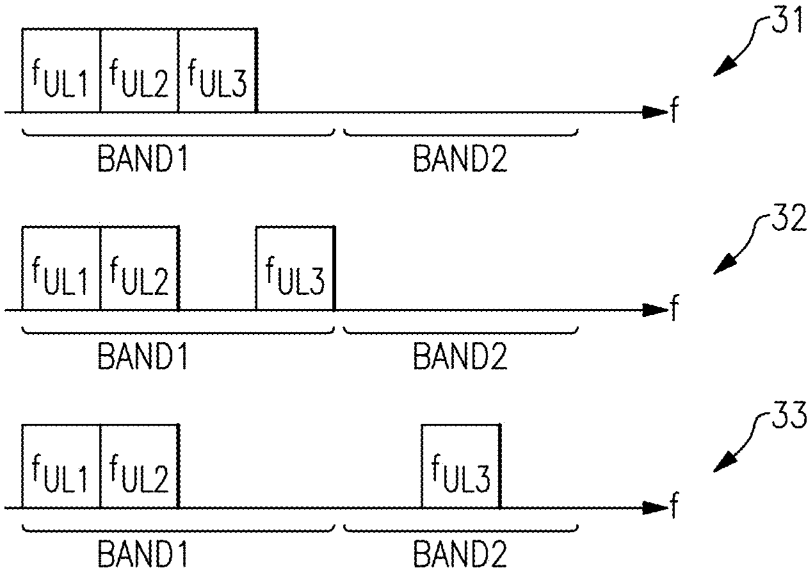
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier full, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers full and full of a first frequency band BAND1 with component carrier $f_{UL3}$ of a second frequency band BAND2.

Figure 2C:
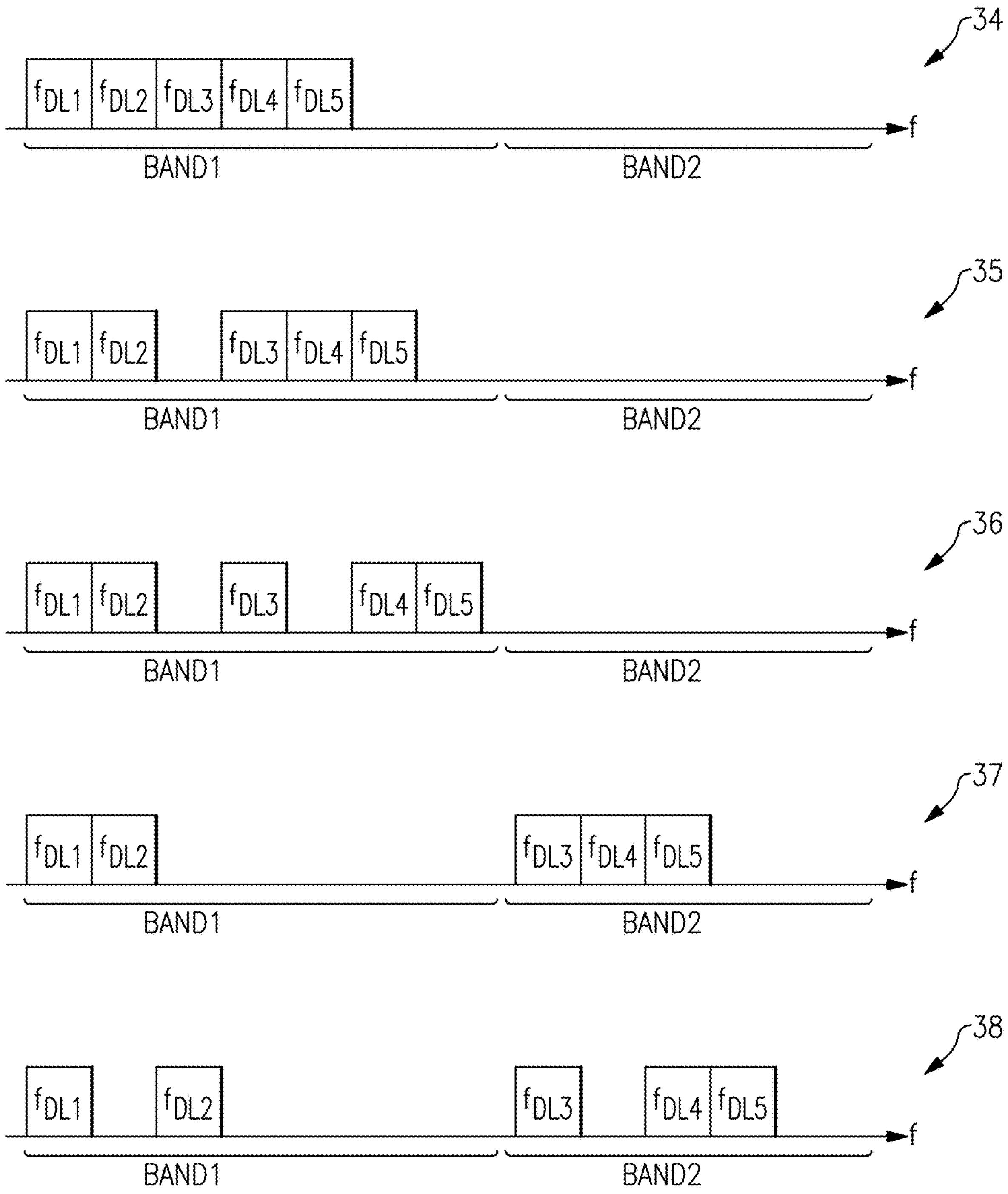
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as Wi-Fi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid Wi-Fi users and/or to coexist with Wi-Fi users. Enhanced license assisted access (eLAA) refers to an evolution of LAA that aggregates licensed and unlicensed spectrum for both downlink and uplink.

Figure 3A:
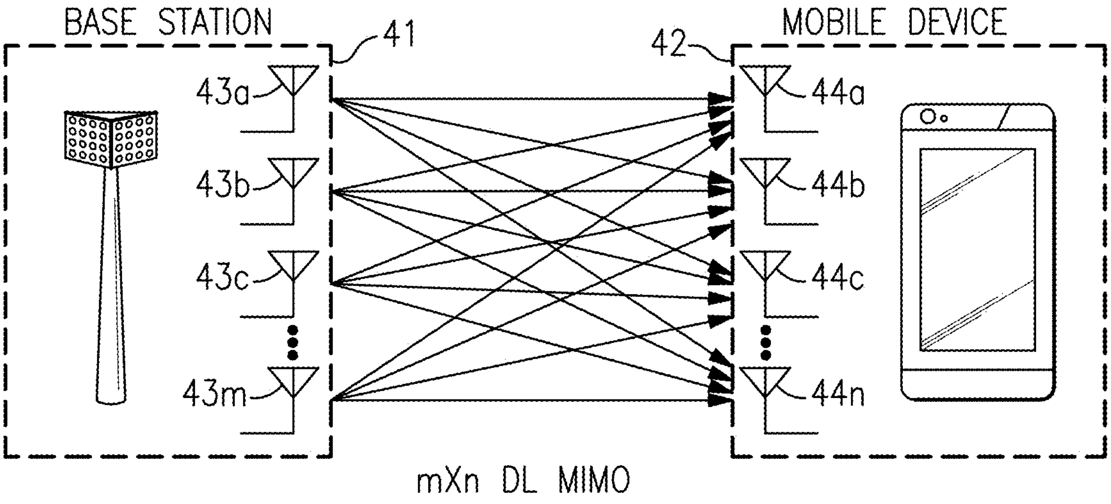
FIG. 3A is a schematic diagram of one example of a downlink channel using multi-input and multi-output (MIMO) communications.
Figure 3B:
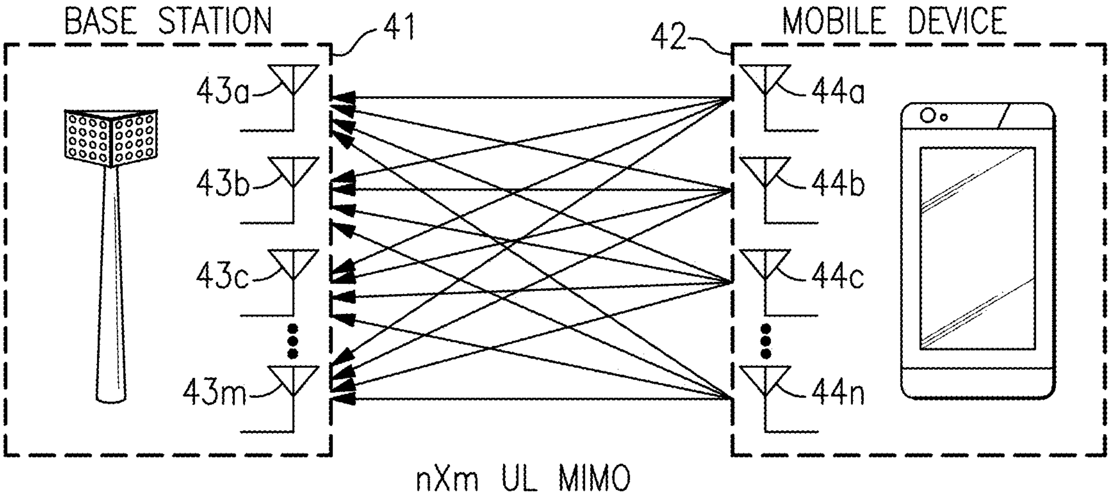
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43*a*, 43*b*, 43*c*, . . . 43*m* of the base station 41 and receiving using N antennas 44*a*, 44*b*, 44*c*, . . . 44*n* of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44*a*, 44*b*, 44*c*, . . . 44*n* of the mobile device 42 and receiving using M antennas 43*a*, 43*b*, 43*c*, . . . 43*m* of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
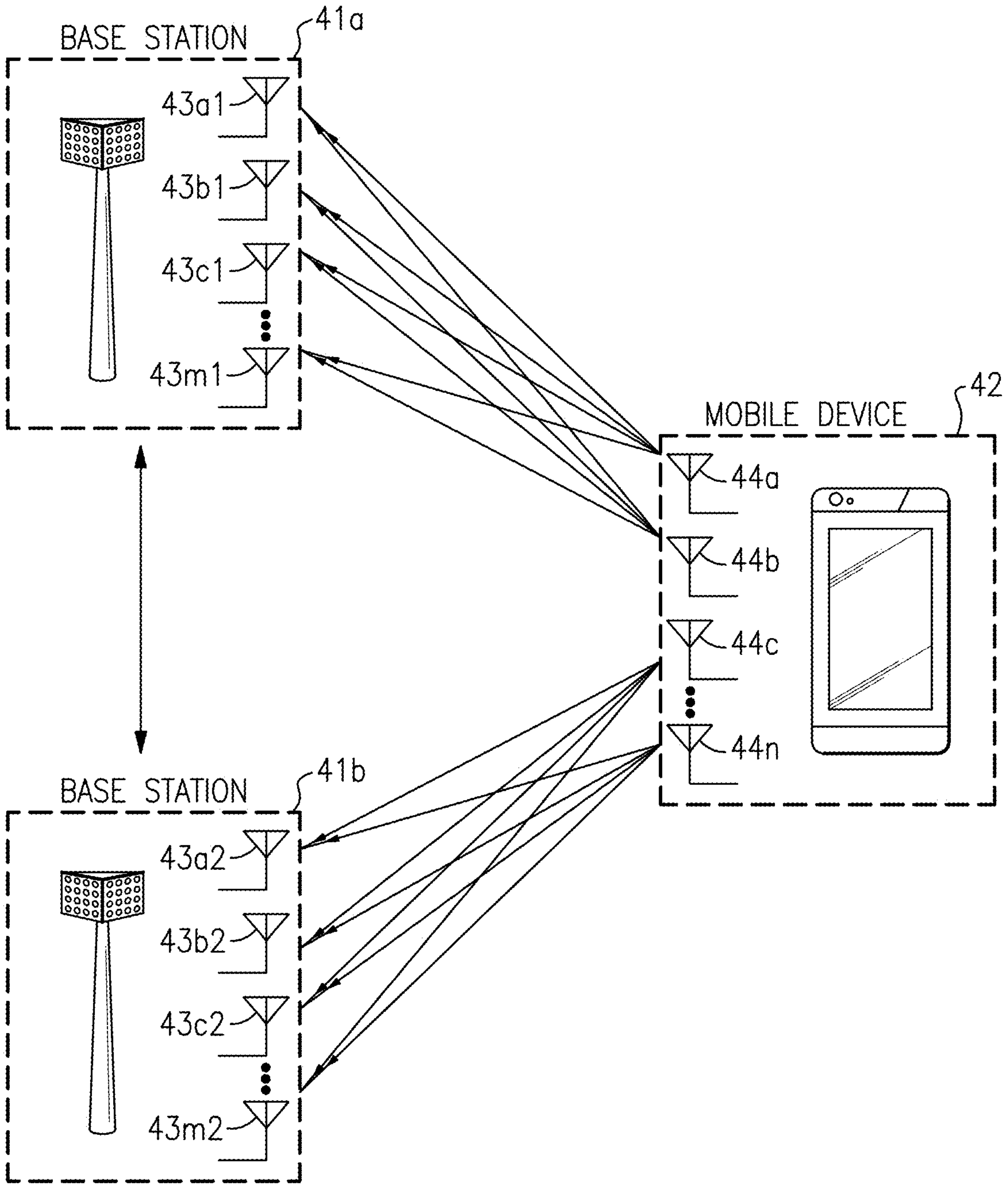
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44*a*, 44*b*, 44*c*, . . . 44*n* of the mobile device 42. Additional a first portion of the uplink transmissions are received using M antennas 43*a*1, 43*b*1, 43*c*1, . . . 43*m*1 of a first base station 41*a*, while a second portion of the uplink transmissions are received using M antennas 43*a*2, 43*b*2, 43*c*2, . . . 43*m*2 of a second base station 41*b*. Additionally, the first base station 41*a* and the second base station 41*b* communication with one another over wired, optical, and/or wireless links.

The MIMO scenario of FIG. 3C illustrates an example in which multiple base stations cooperate to facilitate MIMO communications.

With the introduction of the 5G NR air interface standards, 3GPP has allowed for the simultaneous operation of 5G and 4G standards in order to facilitate the transition. This mode can be referred to as Non-Stand-Alone (NSA) operation or E-UTRAN New Radio-Dual Connectivity (EN-DC) and involves both 4G and 5G carriers being simultaneously transmitted from a user equipment (UE).

In certain EN-DC applications, dual connectivity NSA involves overlaying 5G systems onto an existing 4G core network. For dual connectivity in such applications, the control and synchronization between the base station and the UE can be performed by the 4G network while the 5G network is a complementary radio access network tethered to the 4G anchor. The 4G anchor can connect to the existing 4G network with the overlay of 5G data/control.

Figure 4:
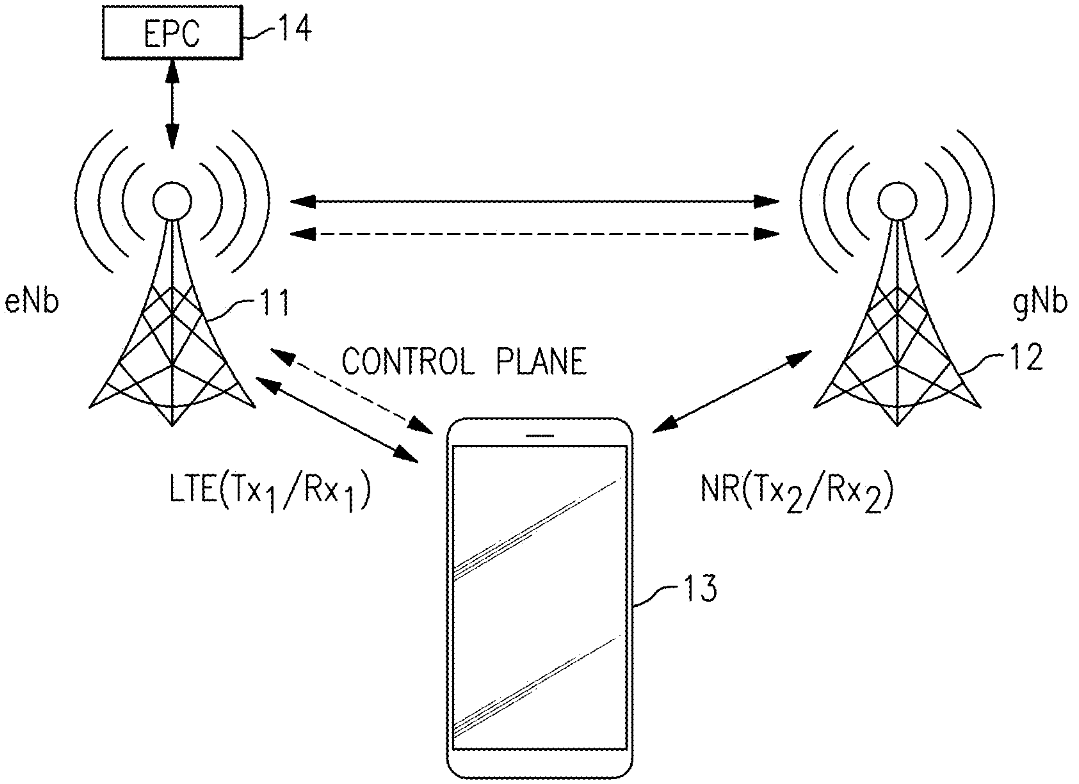
FIG. 4 is a schematic diagram of an example dual connectivity network topology.

FIG. 4 is a schematic diagram of an example dual connectivity network topology. This architecture can leverage LTE legacy coverage to ensure continuity of service delivery and the progressive rollout of 5G cells. A UE 13 can simultaneously transmit dual uplink LTE and NR carriers. The UE 13 can transmit an uplink LTE carrier $Tx_1$ to the eNB 11 while transmitting an uplink NR carrier $Tx_2$ to the gNB 12 to implement dual connectivity. Any suitable combination of uplink carriers $Tx_1$, $Tx_2$ and/or downlink carriers $Rx_1$, $Rx_2$ can be concurrently transmitted via wireless links in the example network topology. The eNB 11 can provide a connection with a core network, such as an Evolved Packet Core (EPC) 14. The gNB 12 can communicate with the core network via the eNB 11. Control plane data can be wireless communicated between the UE 13 and eNB 11. The eNB 11 can also communicate control plane data with the gNB 12. Control plane data can propagate along the paths of the dashed lines in FIG. 4. The solid lines in FIG. 4 are for data plane paths.

In the example dual connectivity topology of FIG. 4, any suitable combinations of standardized bands and radio access technologies (e.g., FDD, TDD, SUL, SDL) can be wirelessly transmitted and received. This can present technical challenges related to having multiple separate radios and bands functioning in the UE 13. With a TDD LTE anchor point, network operation may be synchronous, in which case the operating modes can be constrained to $Tx_1/Tx_2$ and $Rx_1/Rx_2$, or asynchronous which can involve $Tx_1/Tx_2$, $Tx_1/Rx_2$, $Rx_1/Tx_2$, $Rx_1/Rx_2$. When the LTE anchor is a frequency division duplex (FDD) carrier, the TDD/FDD inter-band operation can involve simultaneous $Tx_1/Rx_1/Tx_2$ and $Tx_1/Rx_1/Rx_2$.

As discussed above, EN-DC can involve both 4G and 5G carriers being simultaneously transmitted from a UE. Transmitting both 4G and 5G carriers in a UE, such as a phone, typically involves two power amplifiers (PAs) being active at the same time. Traditionally, having two power amplifiers active simultaneously would involve the placement of one or more additional power amplifiers specifically suited for EN-DC operation. Additional board space and expense is incurred when designing to support such EN-DC/NSA operation.

Wide Channel Bandwidth Front-End Architecture

Modern RF systems often communicate using one or more communication standards, for instance, 4G LTE, 5G, and/or Wi-Fi. One communication standard can specify communication over a frequency band that is relatively close in proximity to and/or overlapping in frequency with another frequency band, or with a frequency band of a different communication standard.

To provide support for multiple communication standards and frequency bands, an RF system can include a relatively wide channel bandwidth front-end architecture configured to reject crossover leakage and/or other noise from neighboring frequency bands. For example, frequency division duplex (FDD) channel bandwidths for 5G NR bands can be up to 50 MHz, as compared to narrower LTE max channel bandwidths of 20 MHz. This can improve receiver performance of the RF system by reducing sensitivity loss (desense) caused by intermodulation distortion (IMD3) generated from TX leakage and crossover leakage.

Figure 5:
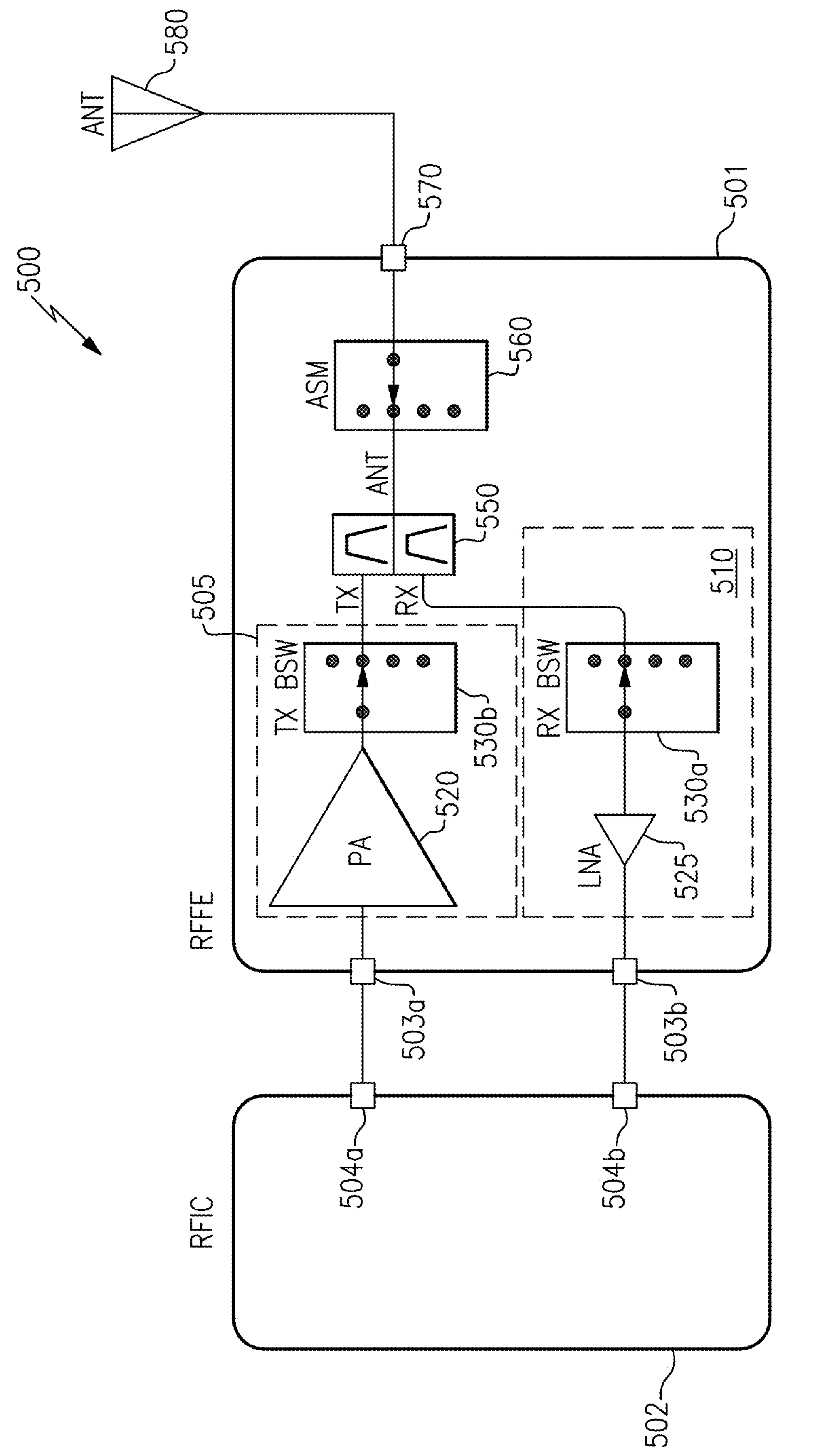
FIG. 5 is a schematic diagram of a radio frequency front-end module according to one embodiment.

FIG. 5 is a schematic diagram of one embodiment of an RF system 500. The RF system 500 includes a radio frequency front-end module (RF FEM) 501, an RF integrated circuit 502 (such as an RF transceiver) communicatively connected to the RF FEM 501, and one or more antennas 580.

The RF FEM 501 is connected to the RF integrated circuit 502 by at least one input port 503*a* and at least one output port 503*b* corresponding to a TX path and a RX path of the RF FEM respectively. At least one corresponding output port 504*a* and at least one corresponding input port 504*b* are provided in the RF integrated circuit 502 to interface with the RF FEM 501.

The RF FEM 501 further includes at least one antenna port 570 to allow TX/RX communication between the one or more antennas 580 and the RF FEM 501. While the illustrated embodiment shows a single antenna that can be used for both TX and RX, in certain embodiments, the RF system 500 can alternatively or additionally have a dedicated TX antenna 580*a* and a dedicated RX antenna connected to the RF FEM 501 by a pair of TX/RX antenna ports, or the RF system can have additional antennas (e.g., diversity receive antennas).

Although FIG. 5 illustrates one embodiment of an RF system, the teachings herein are applicable to RF systems implemented in a wide variety of ways. The RF FEM 501 and RF integrated circuit 502 can be implemented with GaAs, silicon-on-insulator (SOI), and/or or bulk CMOS technologies, and in some cases integrated into the same module.

The RF FEM 501 comprises a transmit (TX) circuit 505 and a receive (RX) circuit 510 operably connected to an RF duplexer 550 having a downlink/receive filter (bottom) and uplink/transmit filter (top).

The RF duplexer 550 is connected to the one or more antennas (580) by way of an antenna switch 560. The antenna switch 560 can be a single-pole, multi-throw (SPMT) switch configured to switch the antenna connection of the RF duplexer 550, e.g., between antennas of an antenna array (other antennas and connections not shown for simplicity of illustration). In other embodiments, several RF FEMs 501 supporting different frequency bands may share a single antenna connection via the antenna switch 560.

The transmit circuit 505 of the FEM 501 includes a transmit power amplifier 520 (e.g., an amplifier including one or more field effect transistors [FETs] or bipolar junction transistors [BJTs] implemented in a GaAs semiconductor die) connected to a transmit switch 530*b* (such as another SPMT switch), which is in turn connected to the uplink portion of the duplexer 550. In certain embodiments, additional filtering circuitry can be provided between the transmit switch 530*b* and the duplexer 550.

In some cases, although not illustrated in FIG. 5, The TX switch 530*b* can be switched to divert an output RF signal of the TX power amplifier 520 to bypass the duplexer 550 and/or connect the power amplifier 520 to another transmit path or other connection (other transmit paths/connections not shown for simplicity of illustration). For example, the TX switch 530*a* can selectively connect an output of the power amplifier 530*a* to another duplexer of the RF FEM 501, or to another RF FEM, or to a pole of the antenna switch 560, e.g., via another transmit filter (not shown).

The receive circuit 510 of the FEM 501 connects to the downlink portion of the duplexer 550 and includes at least a receive amplifier 525 configured to amplify incoming RF signals from the duplexer and a receive switch 530*a*. The receive amplifier 525 is preferably a low-noise amplifier (LNA) (e.g., an amplifier including one or more field effect transistors [FETs] or bipolar junction transistors [BJTs]), and the receive switch 530*a* can be another SPMT switch of the same type as the TX switch 530*b*.

As will be discussed herein, the receive circuit 510 can further include additional signal conditioning and filtering stages to improve receive sensitivity over a wide channel bandwidth. This is particularly relevant for wide channel 5G NR applications wherein transmissions in a TX band can contribute to adjacent channel leakage (crossover leakage) in the RX circuit.

The RF duplexer 550 can filter transmitted and received RF signals by a pair of band pass filters provided in the uplink portion and the downlink portion. The duplexer 550 allows the TX circuit 505 and the RX circuit 510 to share the one or more connected antennas 580 via the antenna switch 560, and can provide for frequency division duplex (FDD) operation, where signals in a communication band are simultaneously transmitted over a transmit channel having a first frequency range within the communication band and over a receive channel having a second different frequency range within the communication band.

In certain embodiments, the antenna switch 560 is configured to switch the RF FEM 501 between a plurality of antennas to support MIMO communication. The TX switch 530*b* can also be directly connected to the antenna switch 560 to selectively bypass the TX filter circuit 540 and duplexer 550, allowing the RF FEM 501 to support additional operating modes.

Figure 6A:
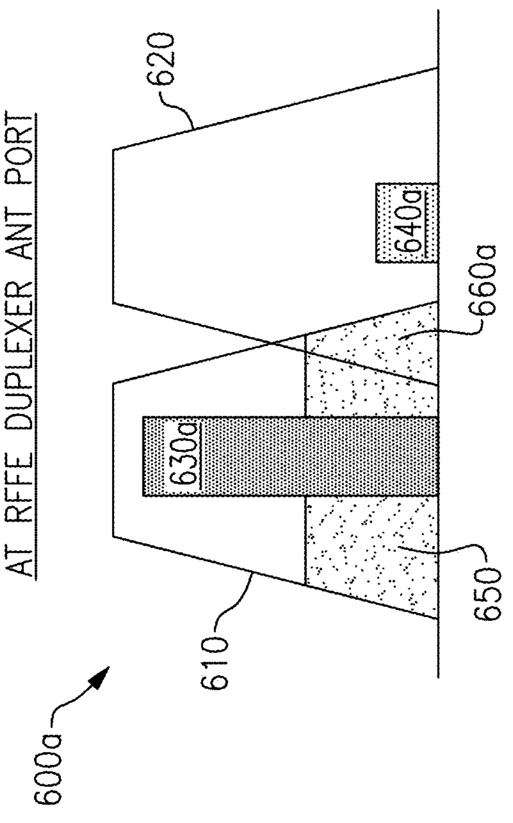
FIGS. 6A-6B illustrate crossover intermodulation distortion (IMD3) measured in the front-end module of FIG. 5.
Figure 6B:
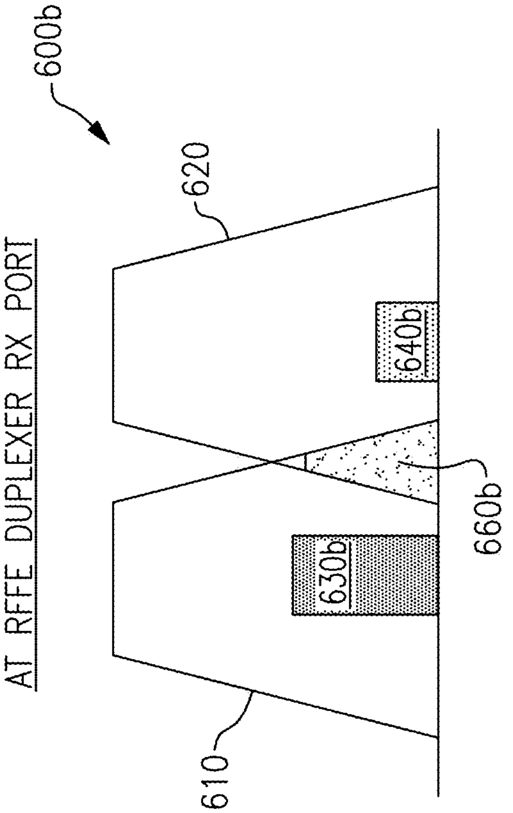

FIGS. 6A and 6B illustrate how TX leakage and adjacent channel leakage in the RF FEM 501 contribute to intermodulation distortion (IMD3) in the RX circuit 510, for an exemplary FDD communication band.

The plot 600*a* of FIG. 6A shows measurements taken at the antenna-side port of the duplexer 550 during FDD operation in an exemplary communication band. The plot 600*a* shows transmit energy 630*a* within the transmit channel of the FDD band, transmit adjacent channel leakage 650, TX crossover leakage 660*a*, and receive energy 640*a* within the RX channel of the FDD band.

The plot 600*b* of FIG. 6B shows measurements taken at the RX output port of the duplexer 550, including transmit leakage 630*b* within the TX channel of the FDD band, TX crossover leakage 660*b*, and receive energy 640*b* within the RX channel of the FDD band.

Those skilled in the art will appreciate that although FIGS. 6A and 6B are not drawn to scale, they are useful in understanding the desense issues that generally affect wideband RF systems. A first bandpass characteristic 610 and a second bandpass characteristic 620 illustrate the band pass filtering behavior of the uplink/transmit filter and the downlink/receive filter of the RF duplexer 550, respectively. The first bandpass characteristic 610 is centered on a narrow TX frequency band 630*a* of the RF FEM 501, the vertical axis of the plot representing a magnitude of a TX signal in the TX frequency band 630*a*. The second bandpass characteristic 620 is centered on a narrow RX frequency band 640*a*, the vertical axis representing a magnitude of an RX signal.

Adjacent channel leakage 650 contributes to RF noise in various frequency bands adjacent to the TX frequency band 630*a*. Although the adjacent channel leakage is constrained by the uplink filter of the duplexer, the uplink filter is not an ideal filter, and some of the RF noise is leaked through to the RX circuit 510 in an overlapping central region 660*a*.

In FIG. 6B, a part of the TX signal in the TX frequency band can leak into the RX circuit 510 at the RX port of the duplexer 550. Due to the filtering of the downlink/receive filter of the duplexer 550, the TX leakage 630*b* (outside the passband of the downlink filter of the duplexer 550) can have a reduced magnitude compared to the TX signal 630*a* of FIG. 6A, while the RX signal 640*b* in the RX frequency channel (within the passband of the downlink filter of the duplexer 550) is passed through the downlink filter of the duplexer 550 with little or no attenuation. However, due to the relatively high power of the TX signal, the magnitude of the TX leakage 630*b* seen at the RX port of the duplexer 550 can still be significant relative to the RX signal 640*b* seen at the RX port of the duplexer 550, and is greater than the RX signal 640*b* in the illustrated embodiment, contributing to desense of the RX circuit 510.

Although the adjacent channel leakage 650 is effectively filtered by the downlink filter of the duplexer 550, in an overlapping central region where the uplink filter and downlink filter skirts in-between their respective passbands suffer some finite overlap, some amount of crossover leakage 660*b* is able to pass through to the RX circuit 510. The crossover leakage 660*b* then combines with the TX leakage 630*b* in the RX circuit 510 to create intermodulation distortion (IMD3), further contributing to a loss of RX sensitivity. The amount of intermodulation distortion can vary depending on characteristics of the RF system 500, particularly a third-order input intercept point (IIP3).

Figure 6C:
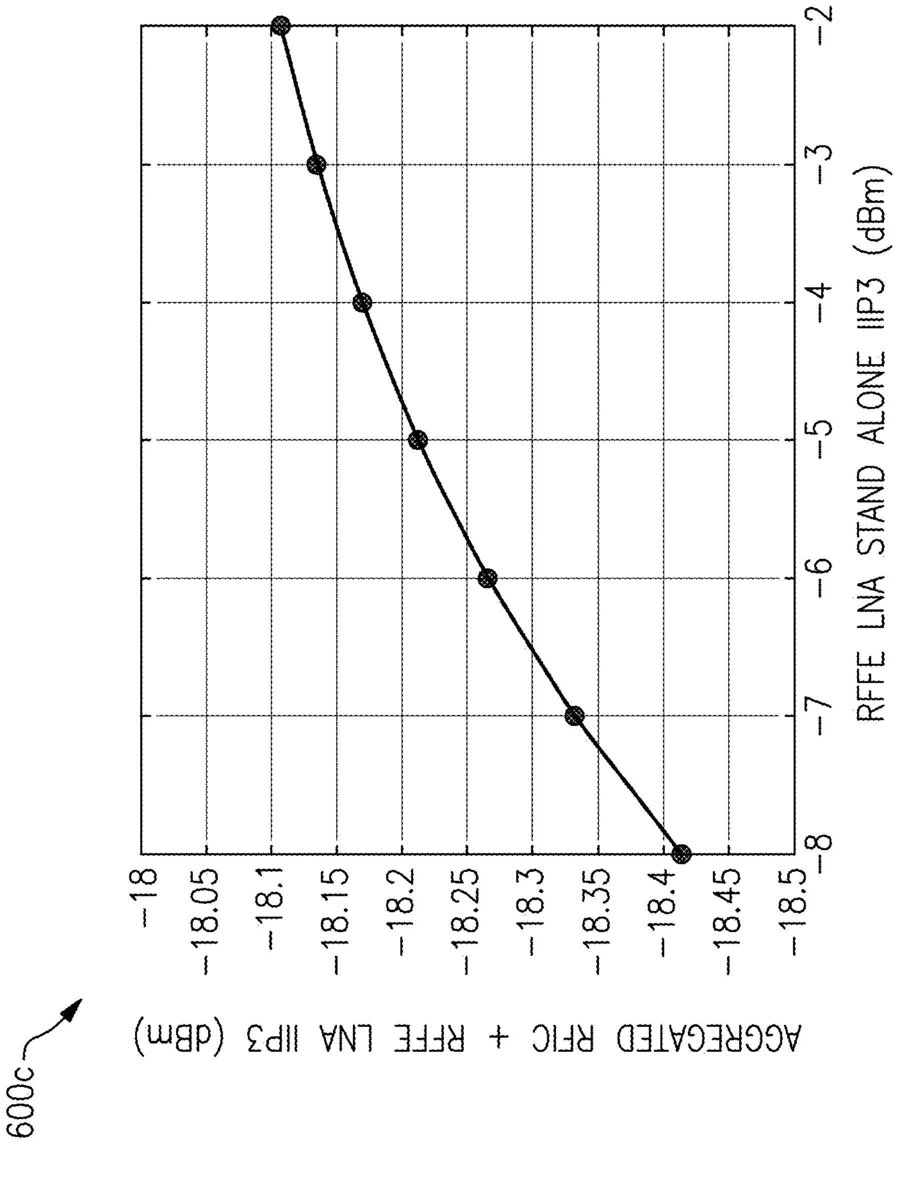
FIG. 6C illustrates a third-order intercept point (IIP3) as a function of power for the front-end module of FIG. 5.

FIG. 6C illustrates a graph 600*c* of the third-order input intercept point for the RF system 500. The vertical axis represents aggregated IIP3 RF power in the combined RF FEM 501 and RF integrated circuit 502, while the horizontal axis represents IIP3 RF power in the receive amplifier (LNA) 525. In the RF system 500, both the receive LNA 525 inside the RF FEM 501 and various circuits of the RF integrated circuit 502 generate IMD3 because of their finite third-order nonlinearity. Certain amplifier designs based on SOI technology can deliver as low as −5 dBm IIP3 at 18 dB gain inside the RF FEM 501. However, IIP3 in the RF integrated circuit 502 can be as poor as 0 dBm, and the corresponding IIP3 refers to the RFFE LNA input (e.g., −18 dBm) which in some cases is 13 dB lower than RF FEM IIP3. Therefore, depending on the circumstances, RX IIP3 of the RF system 500 may be dominated by poor performance of the RF integrated circuit 502.

Figure 7A:
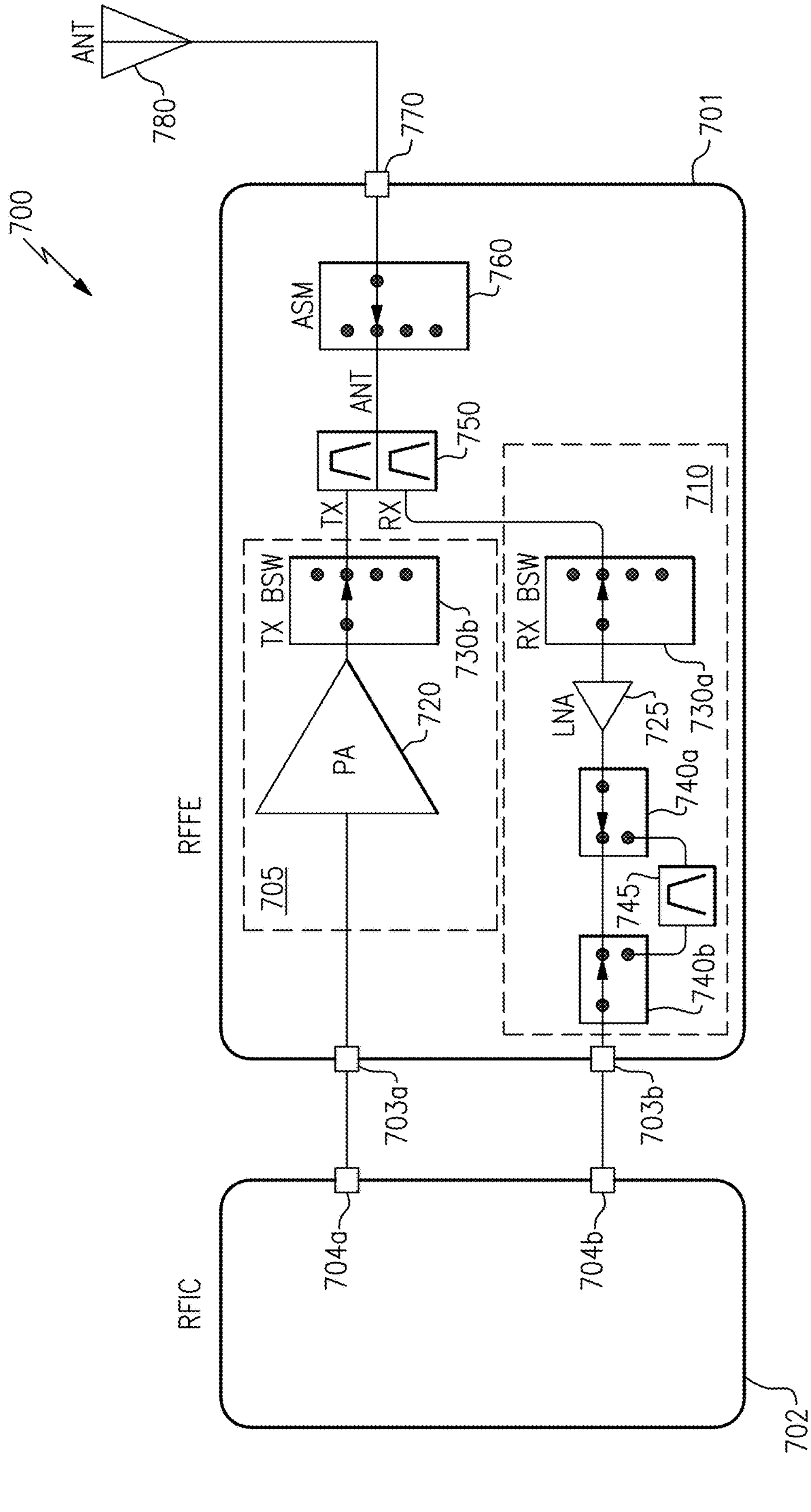
FIGS. 7A-7B show schematic diagrams of radio frequency front-end modules according to different embodiments that include filters following the receive low noise amplifier (LNA).

FIG. 7A is a schematic diagram of an RF system 700 implementing additional features to mitigate intermodulation distortion. The RF system 700 includes a radio frequency front-end module (RF FEM) 701, an RF integrated circuit 702 (such as an RF transceiver implemented on one or more semiconductor dies) communicatively connected to the RF FEM 701, and one or more antennas 780.

The RF FEM 701 is connected to the RF integrated circuit 702 by at least one input port 703*a* and an output port 703*b* corresponding to a TX path and a RX path of the RF FEM respectively. A corresponding output port 704*a* and an input port 704*b* are provided in the RF integrated circuit 702 to interface with the RF FEM 701. The RF FEM 701 further includes at least one antenna port 770 to allow TX/RX functionality of the one or more antennas 780. Although FIG. 7 illustrates one additional embodiment of an RF system, it will be understood that any of the teachings herein as discussed with reference to the RF system 500 of FIG. 5 are can also apply to the RF system 700.

The RF FEM 701 comprises a transmit (TX) circuit 705 and a receive (RX) circuit 710 operably connected to an RF duplexer 750 having a downlink/receive filter (bottom) and uplink/transmit filter (top). The RF duplexer 750 is connected to one or more antennas 780 by way of an antenna switch 760. The antenna switch 760 can be a single-pole, multi-throw (SPMT) switch configured to switch the antenna connection of the RF duplexer 750, e.g., between antennas of an antenna array. The uplink and/or downlink filters of the duplexer 750 can be acoustic filters. For example, the uplink and/or downlink filters of the duplexer 750 can be a bulk acoustic wave (BAW) filter, a surface acoustic wave (SAW) filter, or a temperature-compensated SAW (TC-SAW) filter (e.g., an advanced thin-film TC-SAW filter with various substrate and epitaxial configurations).

The transmit circuit 705 of the FEM 701 includes a transmit power amplifier 720 connected to a transmit switch 730*a* (such as another SPMT switch), which is in turn connected to the uplink portion of the duplexer 750.

Although not illustrated in FIG. 7A, in certain embodiments, filtering circuitry can be provided between the transmit switch 730*b* and the duplexer 750. The TX switch 730*a* can be switched to divert an output RF signal of the TX power amplifier 720 to bypass the duplexer 750 and/or connect the power amplifier 720 to another transmit path or other connection. For example, the TX switch 730*a* can selectively connect an output of the power amplifier 720 to a duplexer of another RF FEM 701, or to a pole of the antenna switch 760 to provide a direct connection to the antenna 780.

The receive circuit 710 of the FEM 701 connects to the downlink/receive portion of the duplexer 750 and includes at least a receive amplifier 725 configured to amplify incoming RF signals from the duplexer and a receive switch 730*a*. The receive amplifier 725 is preferably a low-noise amplifier (LNA), and the RX switch 730*a* can be another SPMT switch of the same type as the TX switch 730*b*.

The receive circuit 710 further includes a receive filter circuit comprising a first filter SPMT switch 740*a*, a second filter SPMT switch 740*b*, and a receive filter 745 connected in series between the first filter switch 740*a* and the second filter switch 740*b*. The receive filter 745 can be a notch filter configured to eliminate or substantially attenuate TX leakage and crossover leakage before an amplified RF signal from the receive amplifier 725 is provided to the RF integrated circuit 702. For example, in some embodiments, the FEM 701 is configured for simultaneous FDD operation in the n3 band, and the receive filter 745 is an acoustic wave notch filter (e.g., SAW, BAW, or TC-SAW filter) configured to attenuate frequencies from about 1710 MHz to about 1805 MHz, which covers both the n3 TX channel (1710-1785 MHz) and the duplex gap between the n3 TX and RX channels in which cross-over leakage can occur (1785-1805 MHz). In some embodiments, the filter 745 can include multiple filters either connected in series or in parallel. For example, in one embodiment, the filter 745 includes two notch filters cascaded in series, one with a stopband of 1710-1785 MHz and one with a stopband of 1785-1805 MHZ.

For wide channel applications, this filter architecture can greatly improve receive sensitivity of the RF system 700 without requiring modification of the RF integrated circuit 702.

In some embodiments, the RF system 700 can receive signals across multiple communication standards and frequency bands. The first filter SPMT switch 740*a* and the second filter SPMT switch 740*b* are switched to selectively couple or uncouple the receive filter 745 from the receive amplifier 725. For example, the receive filter 745 can be a notch filter having a stop band corresponding to adjacent channel leakage (crossover leakage), TX leakage, and/or TX crossover leakage caused by the TX circuit 705 when the RF FEM 701 is transmitting and/or receiving in a 5G NR communication band. Moreover, when the RF FEM 701 is not transmitting, or is transmitting in a different communication band or standard (e.g., an LTE band having a narrower max channel bandwidth), the first filter SPMT switch 740*a* and the second filter SPMT switch 740*b* can be switched to bypass the receive filter 745 entirely.

In another embodiment, the first filter SPMT switch 740*a* and the second filter SPMT switch 740*b* can have multiple throws connected to a plurality of receive filters 745, each receive filter having a stop band corresponding to adjacent channel leakage, leakage, and/or crossover leakage of a specific frequency band (e.g., a TX channel of an FDD band). The first filter switch 740*a* and the second filter switch 740*b* can then be switched to selectively couple or uncouple each of the receive filters 745 according to the current operating mode of the TX circuit 705. For example, the switches 740*a*, 740*b* can be controlled by a processor of the RFFE 700 or another processor programmed to switch in the filter 745 when RFFE 700 is transmitting and/or receiving in the TX channel (e.g., during FDD operation in the n3 band or another NR band).

The selectable receive filter 745 can therefore mitigate IMD3 in the RF system 700 by preventing it from being generated in the RF integrated circuit 702. The selectable receive filter 745 rejects TX leakage and/or adjacent channel leakage (crossover leakage) before they are sent to the RF integrated circuit with low IIP3 generating IMD3 lands on the desired RX frequency. Transmit and receive performance of the RF system 700 are not compromised by the selectable receive filter 745 because the duplexer 750 can be the same as the duplexer 550 of the RF FEM 501. System noise figure is not significantly affected because the receive filter 745 is positioned after the receive amplifier (LNA) 725. The receive filter 745 can be acoustic filters. For example, the receive filter 745 can be a bulk acoustic wave (BAW) filter, a surface acoustic wave (SAW) filter, or a temperature-compensated SAW (TC-SAW) filter (e.g., an advanced thin-film TC-SAW filter with various substrate and epitaxial configurations) to provide at least 30 dB of noise rejection. Because the duplexer 750 already provides strong rejection of TX signal energy from entering the RX circuit, the specifications of selectable receive filter 745 can be less stringent than the downlink filter of the duplexer 750, and the receive filter 745 can preferably be implemented on low-cost, small-size dual-mode SAW technology.

The RF duplexer 750 can filter transmitted and received RF signals by a pair of band pass filters provided in the uplink portion and the downlink portion. The duplexer 750 allows the TX circuit 705 and the RX circuit 710 to share the one or more connected antennas 780 via the antenna switch 760, and can provide for frequency division duplex (FDD) operation. In certain embodiments, the antenna switch 760 is configured to switch the RF FEM 701 between a plurality of antennas to support MIMO communication. The TX switch 730*b* can also be directly connected to the antenna switch 760 to selectively bypass the TX filter circuit 740 and duplexer 750, allowing the RF FEM 701 to support additional operating modes.

Figure 7B:
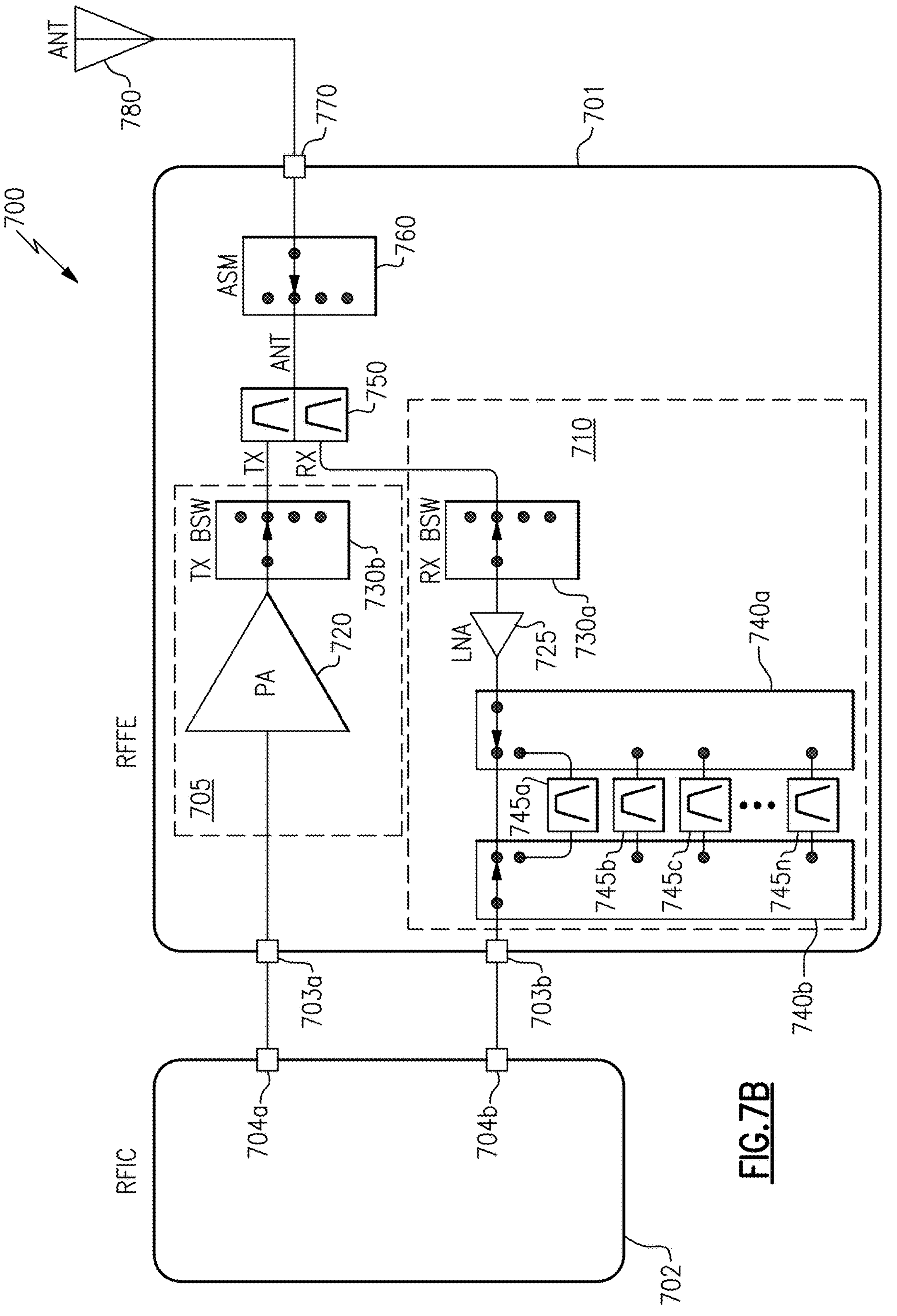

While FIG. 7A shows an implementation including a single receive filter 745, in other embodiments, the receive circuit 710 can include multiple receive filters. For example, FIG. 7B shows an implementation including a bank of filters 745*a*-745*n*. The switches 740*a*, 740*b* each include n throws to selectively include one of the filters 745*a*-745*n*, or bypass the filters 745*a*-745*n*, depending on the mode of operation. For example, each of the filters 745*a*-745*n* may have a passband centered on a transmit channel frequency for a corresponding NR band (e.g., MB n1, n3, n25, n66, HB n30, n7, LB n8, n12, n20, n26, n28, n71 and any FDD bands) (or centered on a TX cross-over leakage frequency), and the switches 740*a*, 740*b* can be controlled by a processor of the RFFE 700 or another processor to switch in the appropriate filter 745*a*-745*n* when RFFE 700 is transmitting and/or receiving in the corresponding NR band (e.g., during FDD operation in that NR band). The filters 745*a-n* can be acoustic filters. For example, one or more of the receive filters 745*a-n* can be a bulk acoustic wave (BAW) filter, a surface acoustic wave (SAW) filter, or a temperature-compensated SAW (TC-SAW) filter (e.g., an advanced thin-film TC-SAW filter with various substrate and epitaxial configurations) to provide at least 30 dB of noise rejection.

Figure 7C:
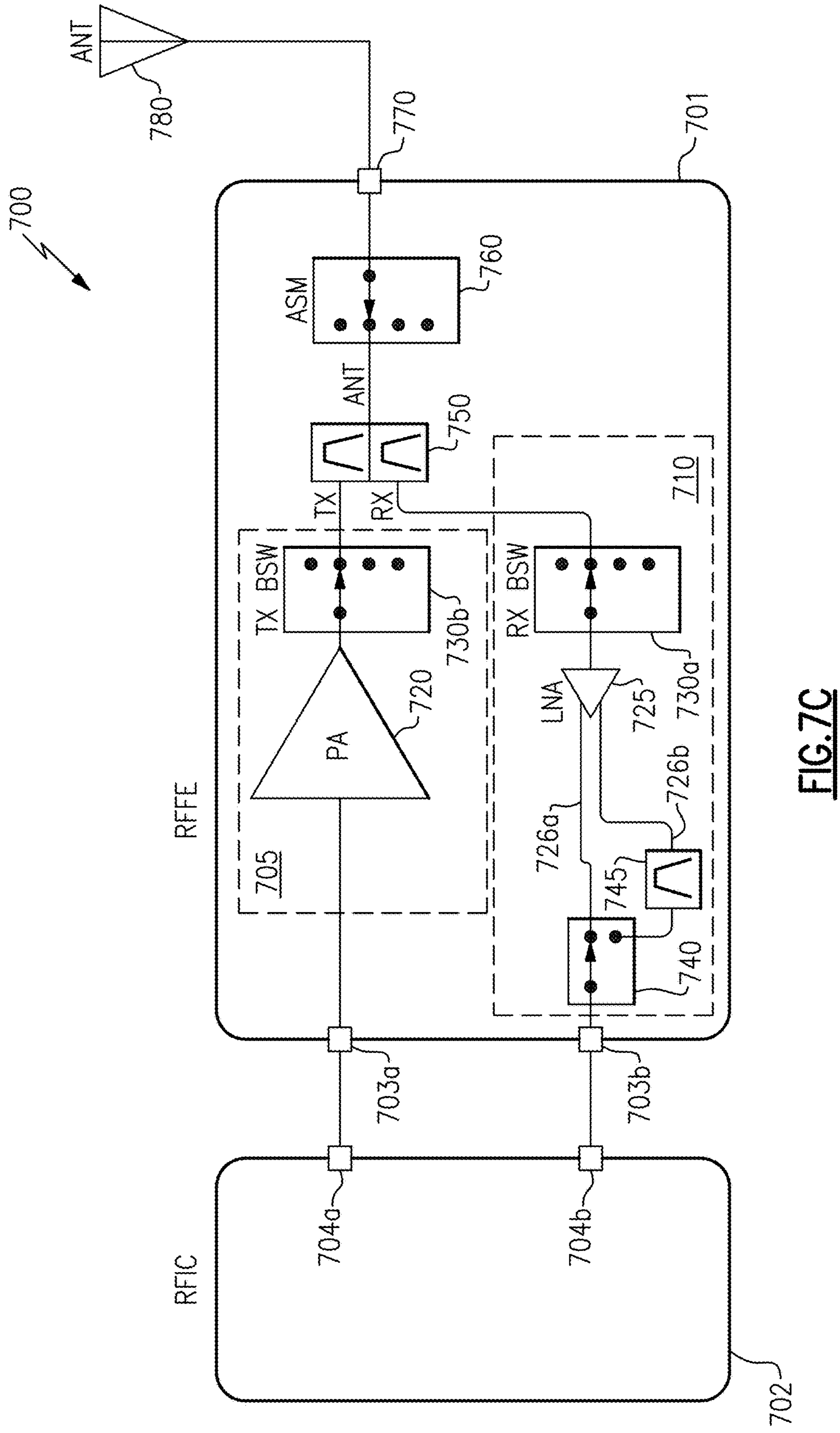
FIG. 7C is a schematic diagram of a radio frequency front-end module according to another embodiment.

FIG. 7C illustrates an embodiment of an RFFE 701 where the LNA 725 includes two amplified output paths 726*a*, 726*b*, including a first path 726*a* connected directly to the switch 740 and a second path 726*b* connected via the filter 745 to the switch 740. The switch 740 can be selectively controlled to pass the unfiltered signal of the first path 726*a* or the filtered signal 726*b* of the first path, depending on the mode of operation. As compared with the RFFE 701 of FIG. 7A, the RFFE 701 of FIG. 7C includes only one switch 740.

Figure 7D:
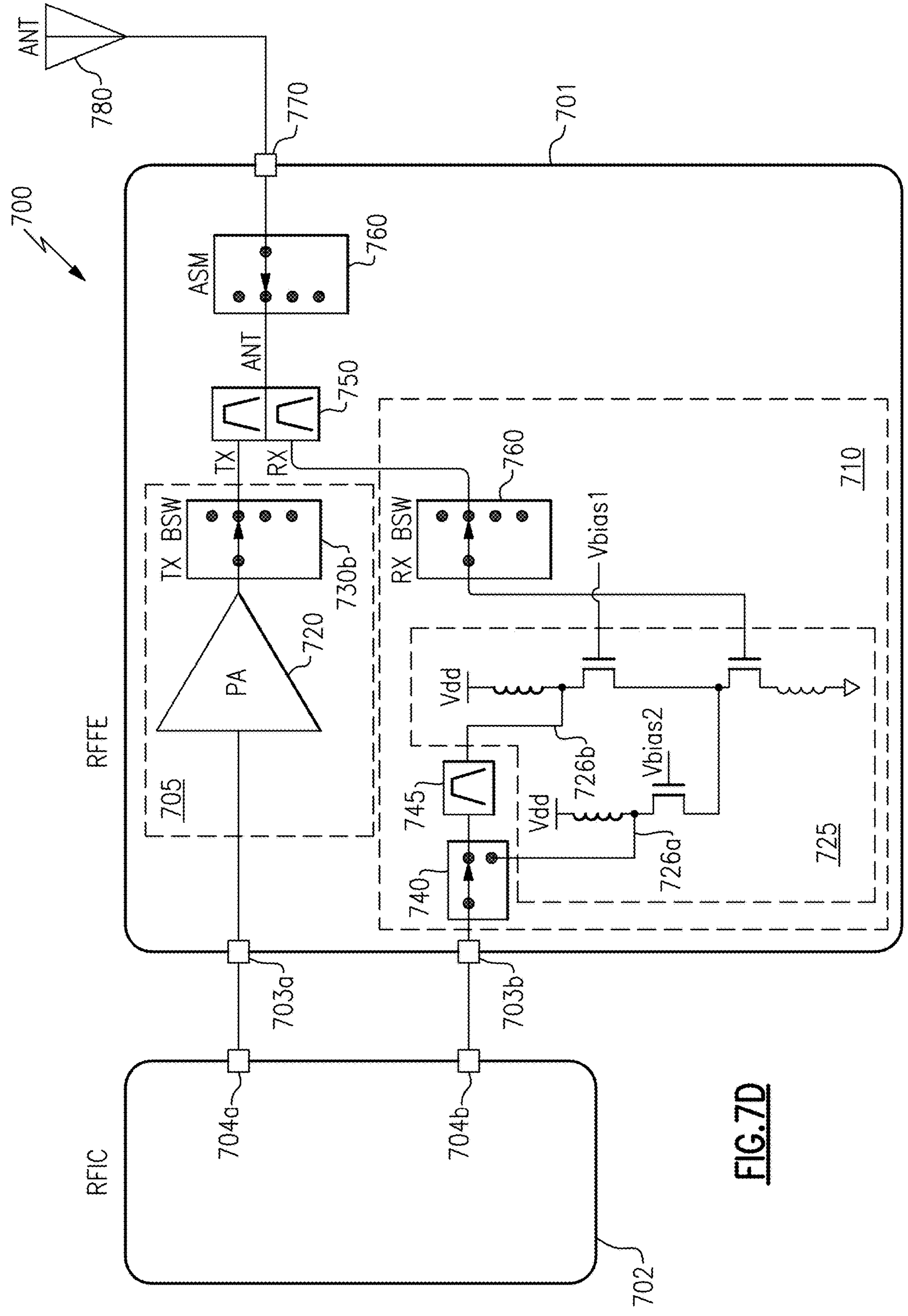
FIG. 7D is a schematic diagram of a radio frequency front-end module according to another embodiment.

FIG. 7D illustrates an example of an implementation an LNA 725 with two output paths 726*a*, 726*b*. For example, the LNA 725 of FIG. 7C can be the LNA 725 of FIG. 7D. A first output path 726*a* provides a first amplified version of the receive signal to a first port of the switch 740, and a second output path 726*b* provides a second amplified version of the receive signal to a second port of the switch 740. As shown, the two paths 726*a*, 726*b* share a common amplifying transistor having a gate serving as an input to the LNA 725, and connected to the output of the receive switch 760. The first path 726*a* includes a biasing transistor having a gate connected to bias voltage Vbias1, and the second path 726*b* includes a biasing transistor having a bate connected to a second bias voltage Vbias2.

Figure 8B:
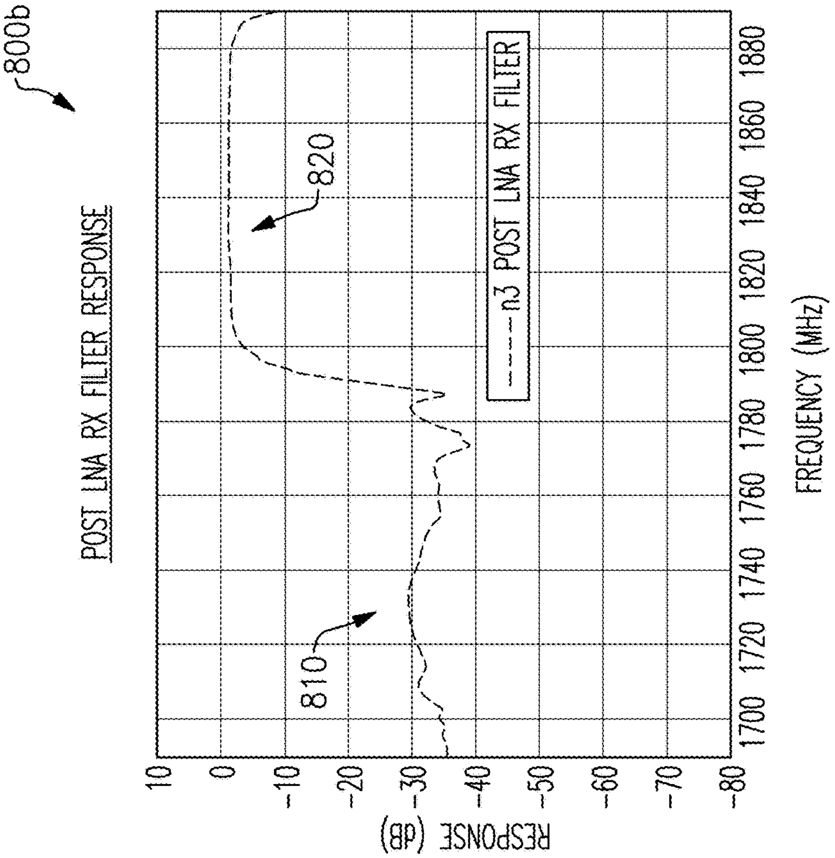
FIG. 8B illustrates an n3 band frequency response for a filtered radio frequency output of the front-end module of FIG. 7A.
Figure 8A:
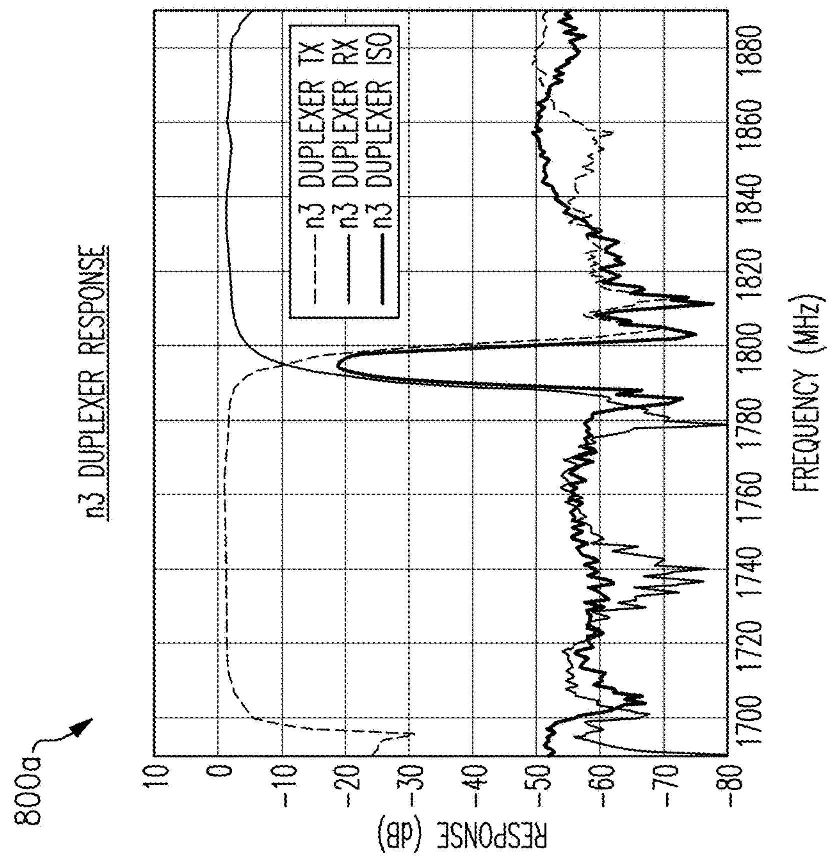
FIG. 8A illustrates a frequency response in the 5G new radio n3 band for various parts of the front-end module of FIG. 7A.

FIG. 8A illustrates a simulated frequency response 800*a* during transmission in the 5G NR n3 band measured at various points within the RF front end module 701 of FIG. 7. From approximately 1710 MHz to 1785 MHz, corresponding to the n3 uplink band, signal attenuation is minimal at a TX port of the duplexer 750. From approximately 1805 MHz to 1880 MHz, corresponding to the n3 downlink band, signal attenuation is minimal at an RX port of the duplexer 750. In a narrow central region between the uplink and downlink bands, the duplexer 750 provides approximately 20 dB noise rejection measured at the antenna port 770.

FIG. 8B illustrates the simulated n3 band frequency response 800*b* at a filtered RX output of the RF front end module 701. In a first region 810, corresponding to n3 band uplink frequencies, the selectable RX filter 745 provides at least 30 dB noise rejection. In a second region 820, corresponding to the n3 band downlink frequencies, the selectable RX filter 745 allows the RF signal to pass unaffected. Accordingly, the RF FEM 701 can substantially attenuate RF noise components corresponding to frequencies where TX leakage and crossover leakage would otherwise occur in the n3 band.

This attenuation can avoid the RF system 700 becoming desensitized due to IMD3, a product of TX and crossover leakage. For example, reducing crossover leakage can greatly improve the adjacent channel leakage ratio (ACLR) of the system 700. The characteristics and type of the receive filter 745 (e.g., low-pass filter, high-pass filter, notch filter, etc.) can be adapted to the specific frequency bands for which the RF system 700 will be used. Those skilled in the art will appreciate that although FIGS. 8A and 8B illustrate noise rejection for the n3 band, the inventions herein are applicable to any band which suffers from desense caused by IMD3.

FIGS. 9A-9E illustrate TX leakage and crossover leakage in the n3 band for the RF FEM 501 and the RF FEM 701 of FIG. 5 (without a post-LNA filter [900*a*-900*e*]) and FIG. 7A (with a post-LNA filter 745 [905*a*-905*e*]). The channel bandwidth in each figure is increased in 10 MHz increments, with FIG. 9A having a 5 MHz bandwidth and FIG. 9E having a 45 MHz bandwidth. As the channel bandwidth is increased, differences become apparent between a frequency response 900*a* of the architecture corresponding to the RF FEM 501 (without a post-LNA filter) and a frequency response 905*a*-905*e* of the architecture corresponding to the RF FEM 701 (with a post-LNA filter 745).

Figure 9A:
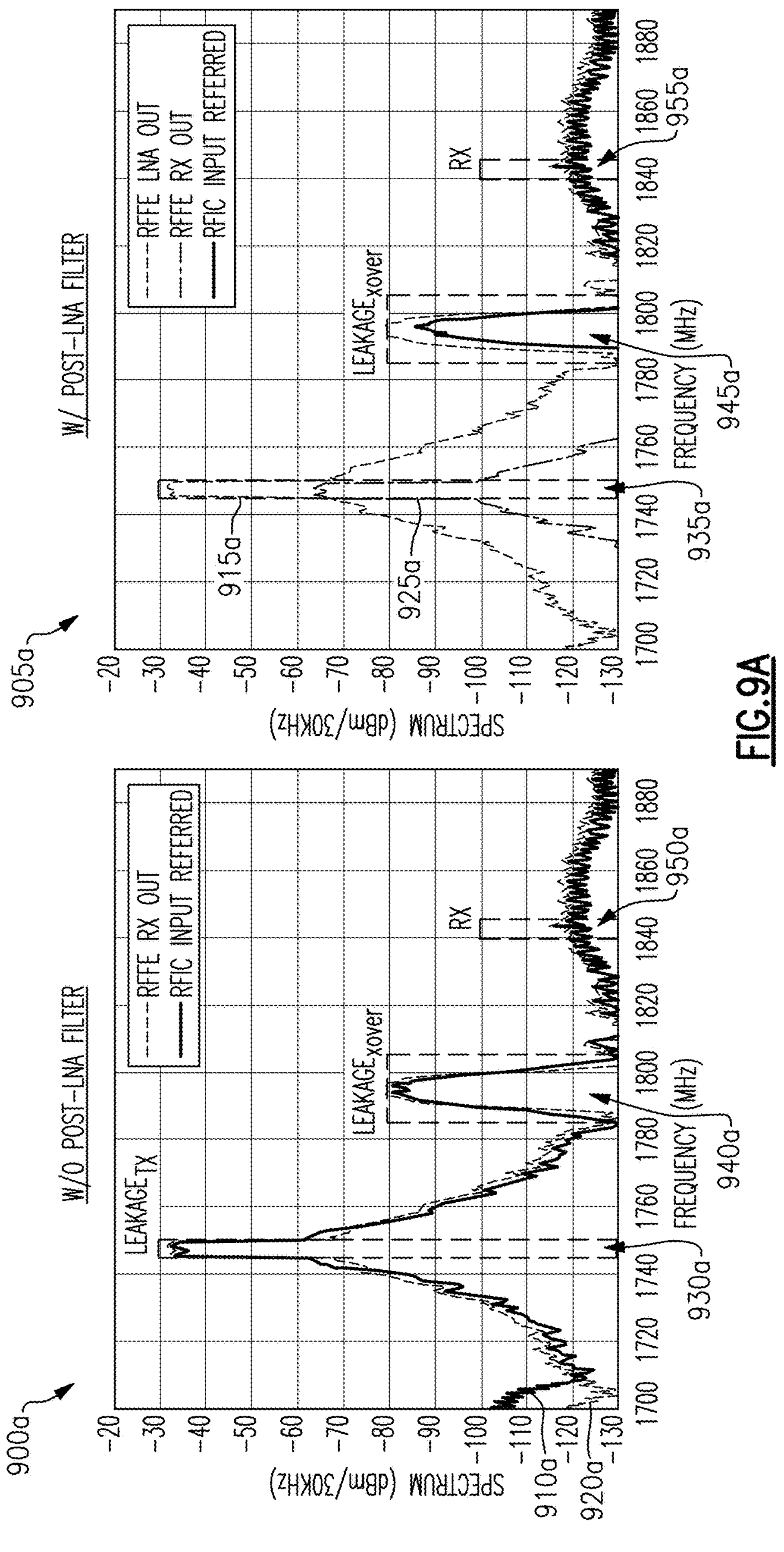
FIGS. 9A-9E illustrate crossover leakage in the n3 band for the front-end modules of FIGS. 5 and 7A, with channel bandwidth ranging from 5 MHz through 45 MHz.
Figure 9B:
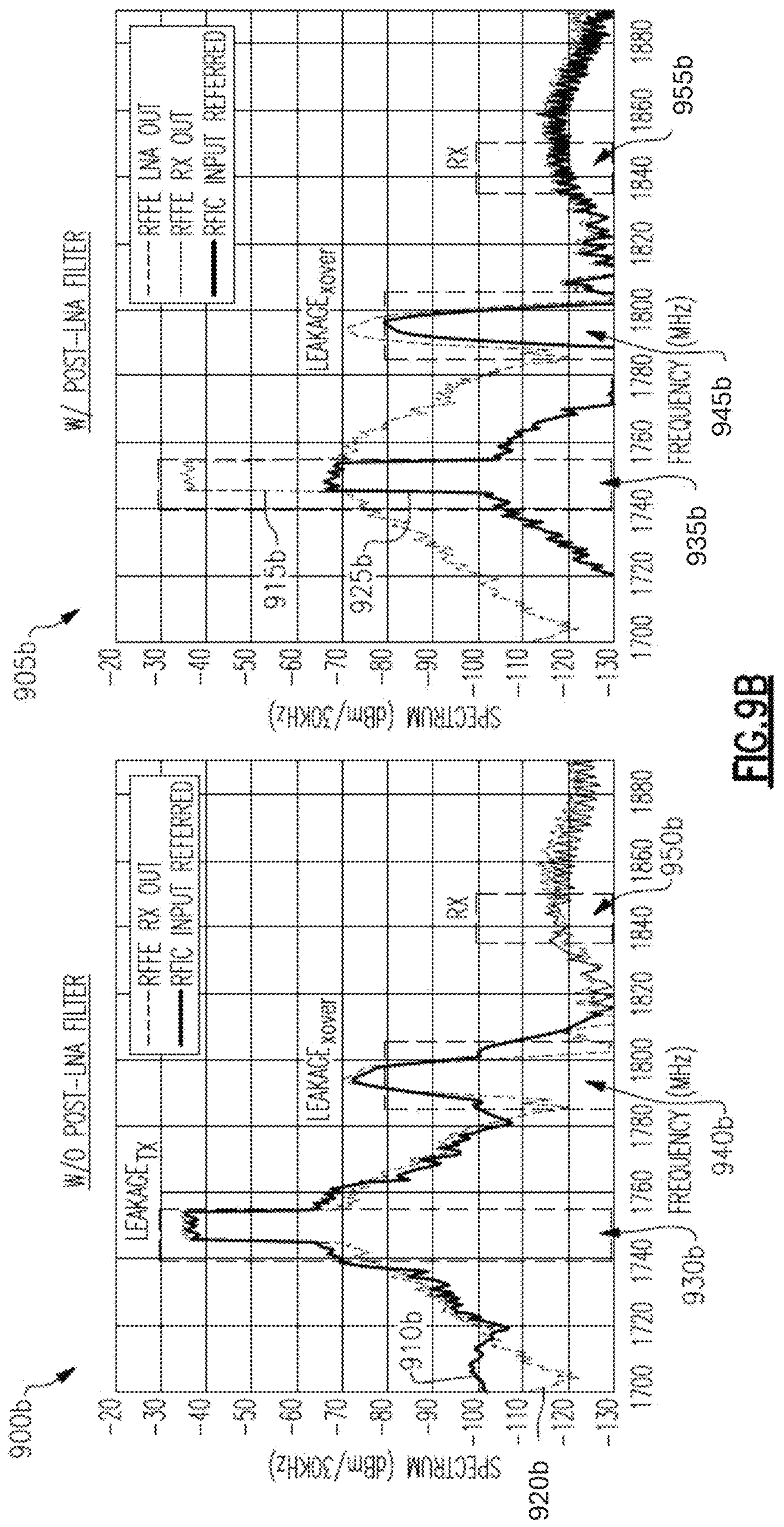
Figure 9C:
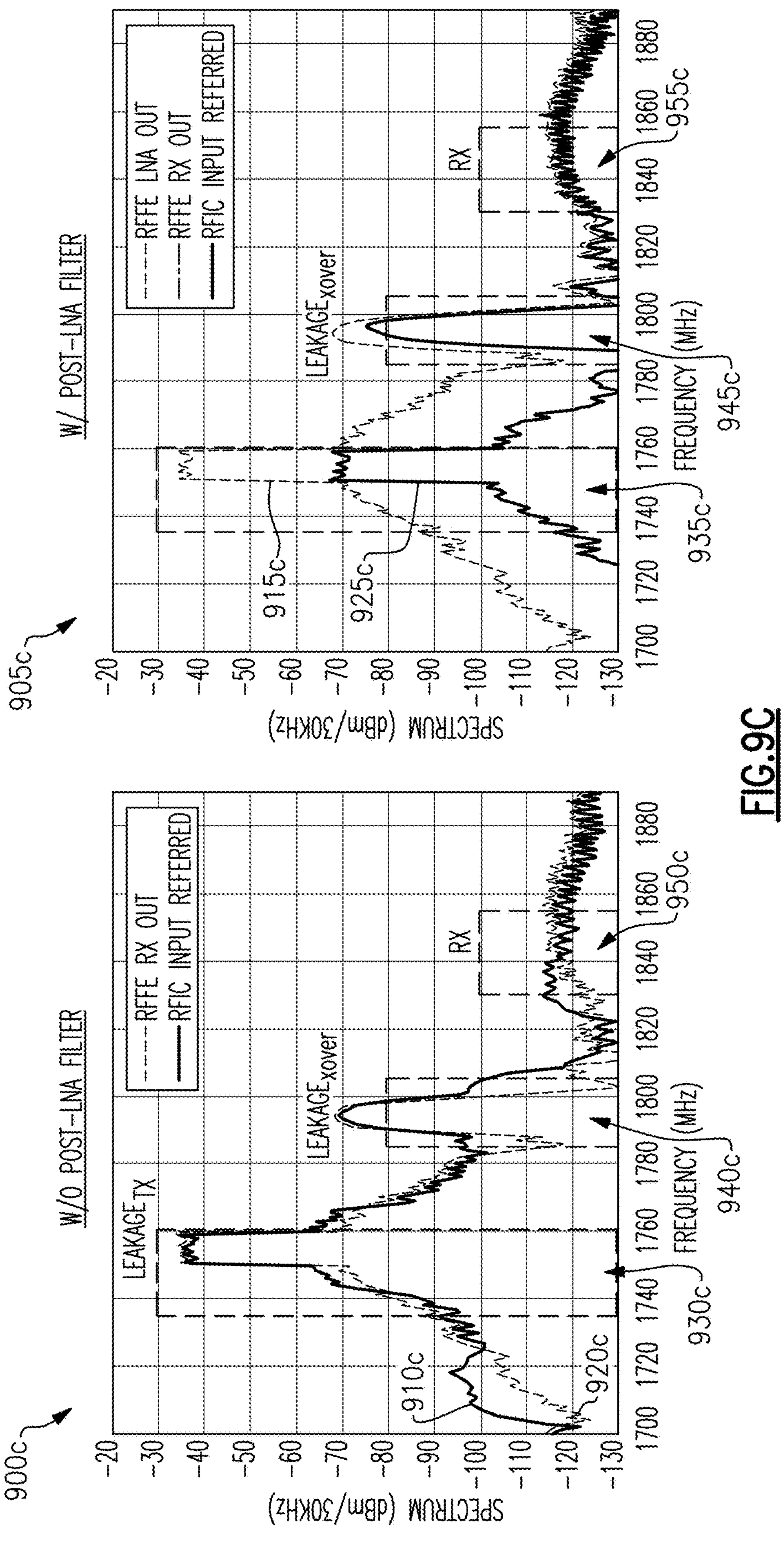
Figure 9D:
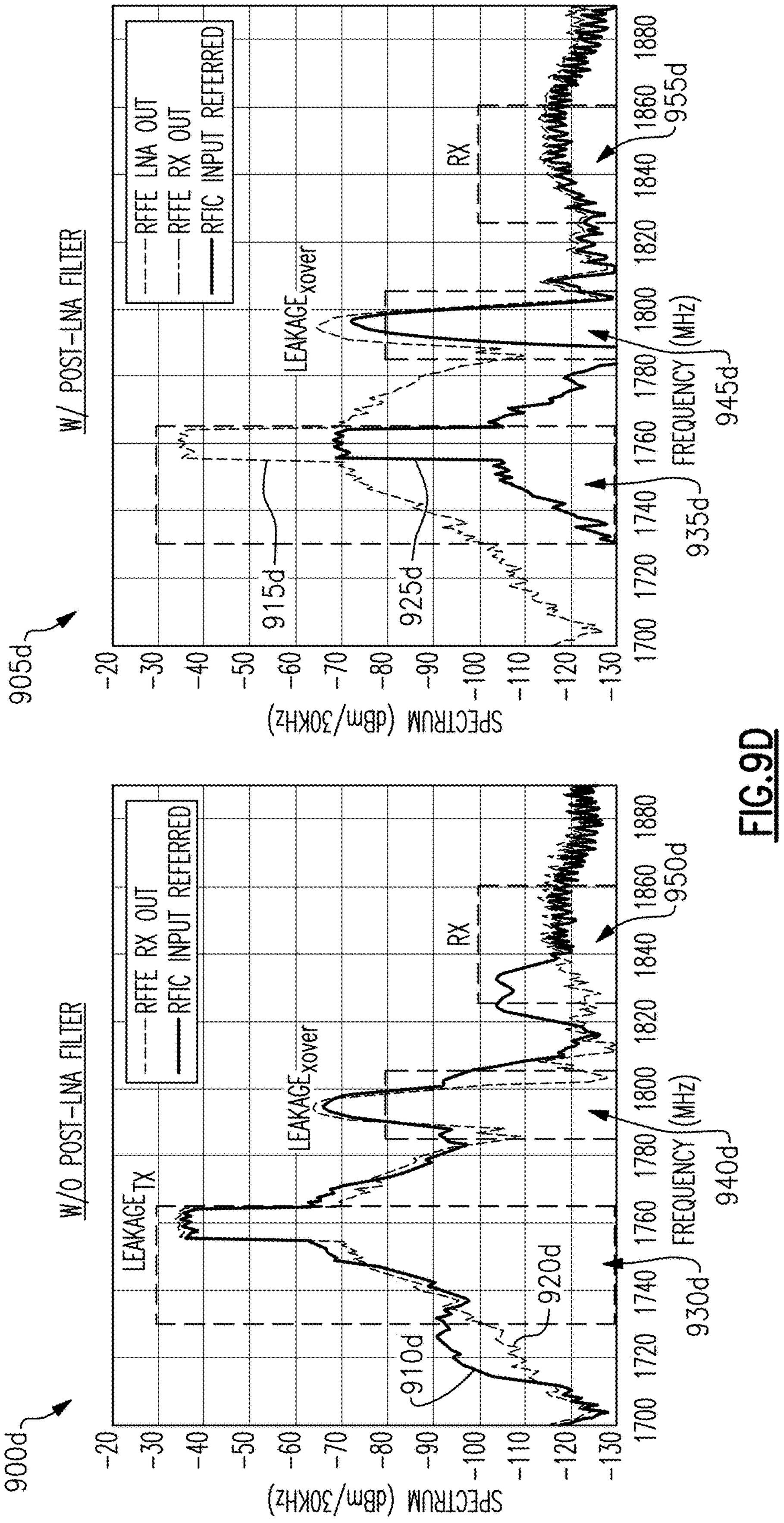
Figure 9E:
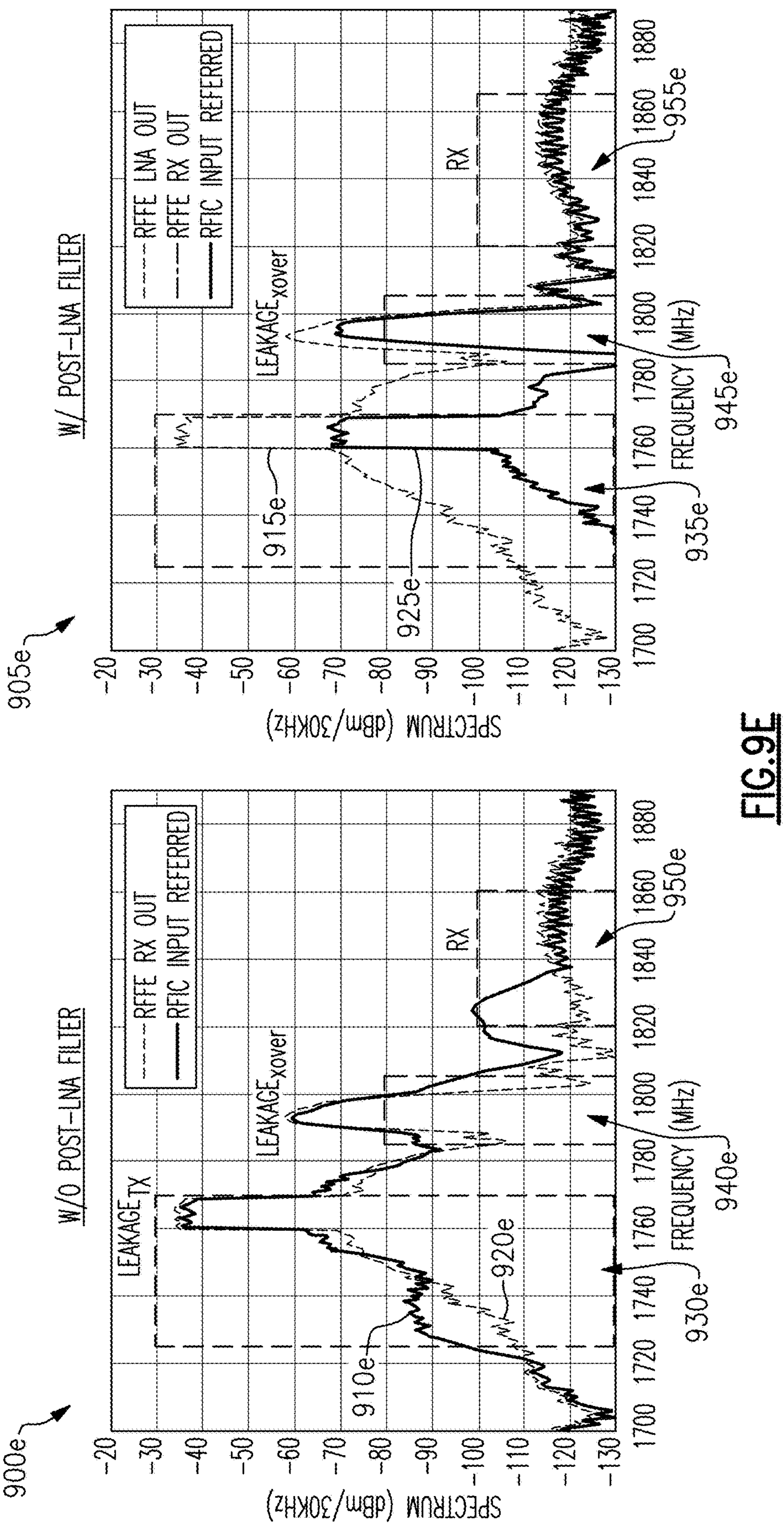

In FIG. 9A, a first signal 910*a* at the output port 503*b* of the RF FEM 501 is compared with a second signal 920*a* at the input port 504*b* of the RF integrated circuit 502. A third signal 915*a* at an output of the receive amplifier 725 of the RF FEM 701 (prior to the receive filter 745) is compared with a fourth signal 925*a*-925*e* at an input port 704*b* of the RF integrated circuit 702. Each frequency response 900*a*/905*a* shows a frequency range 930*a*/935*a* corresponding to the band n3 uplink (and by extension, TX leakage). The frequency responses 900*a*/905*a* further show a frequency range 950*a*/955*a* corresponding to the band n3 downlink. In a central region between each of the uplink and downlink bands is shown crossover leakage 940*a*/945*a* which can contribute to IMD3.

The effects of the receive filter 745 in the RF FEM 701 are reflected in the frequency response 905*a*, with TX leakage 935*a* reduced by over 30 dB compared to the output of the receive amplifier 725. Crossover leakage 945*a* is also reduced. The difference becomes more apparent as channel bandwidth is subsequently increased in FIG. 9B-9E. For example, in FIG. 9E (illustrating 45 MHz bandwidth), crossover leakage 945*e* is reduced by at least 10 dB compared to the output of the receive amplifier 725. The receive filter 745 also linearizes the frequency response in the downlink frequency bands 955*a-c*. As channel bandwidth is increased, particularly above 25 MHz, the unfiltered RF input 910*a-e* begins to show significant intermodulation distortion in the lower frequencies of the downlink band, reducing sensitivity of the RF system 500.

Figure 10:
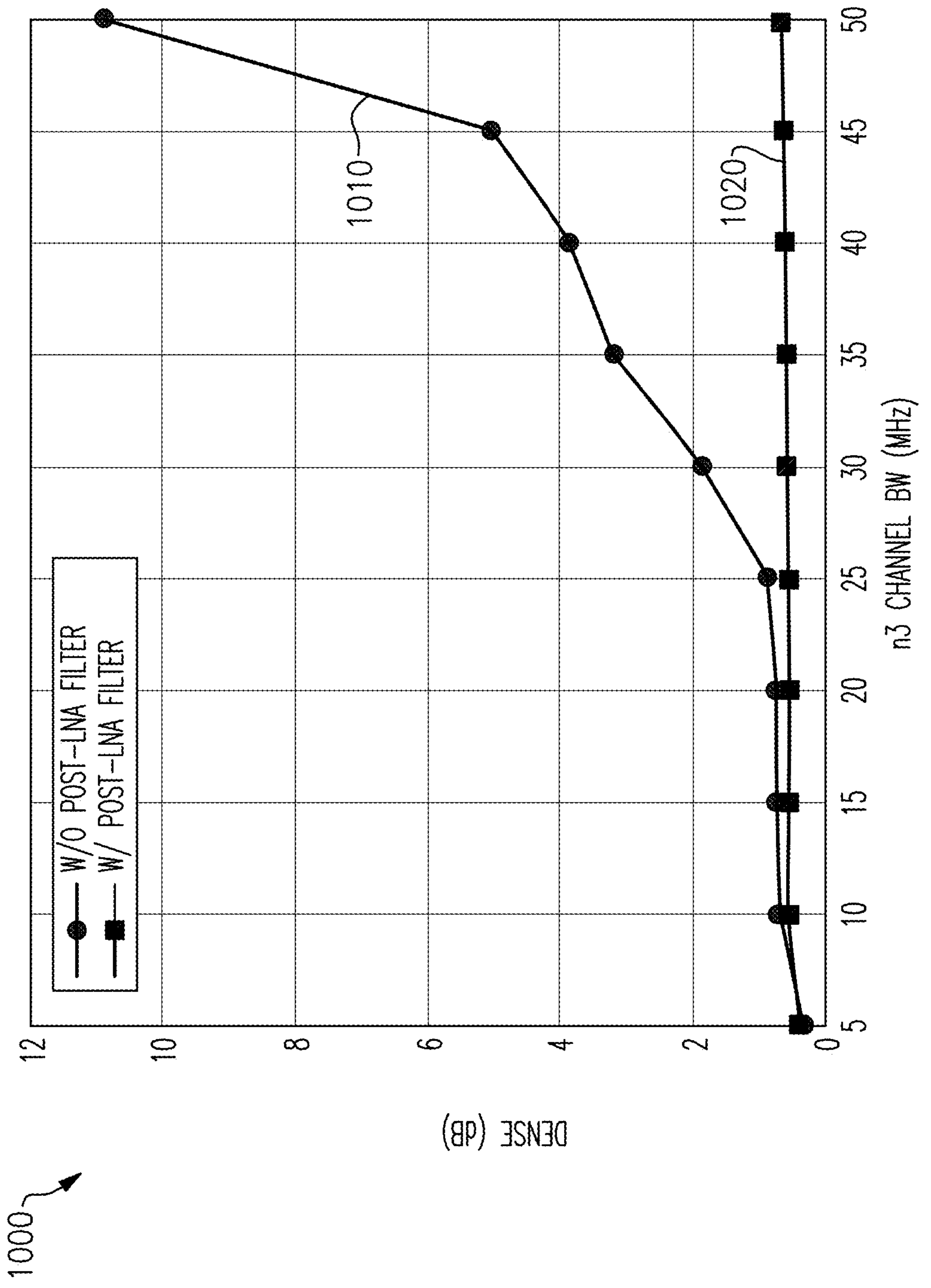
FIG. 10 illustrates desense in the n3 band for the front-end modules of FIGS. 5 and 7A, with channel bandwidth ranging from 0 MHz through 50 MHz.

FIG. 10 illustrates how this desense in the n3 band is corrected by the RF FEM 701 of FIG. 7. A graph 1000 shows desense (dB) plotted on the vertical axis for channel bandwidths ranging from 0 MHz through 50 MHz. Below about 20 MHz bandwidth, there is not an appreciable difference between a first plot 1010 corresponding to desense of the RF FEM 501 of FIG. 5 and a second plot 1020 corresponding to desense of the RF FEM 701 of FIG. 7. However, above 25 MHz the issue becomes pronounced in the plot 1010 of the unfiltered FEM 501, with desense raising above 10 dB and greatly diminishing the sensitivity of the RF system 500. The switchable receive filter 745 of the RF FEM 701 effectively blocks TX leakage and crossover leakage before they can generate IMD3, thereby maintaining desense in the RF system 700 below 1 dB even at bandwidths above 50 MHZ.

Mobile Device and RF Front-End System

Figure 11:
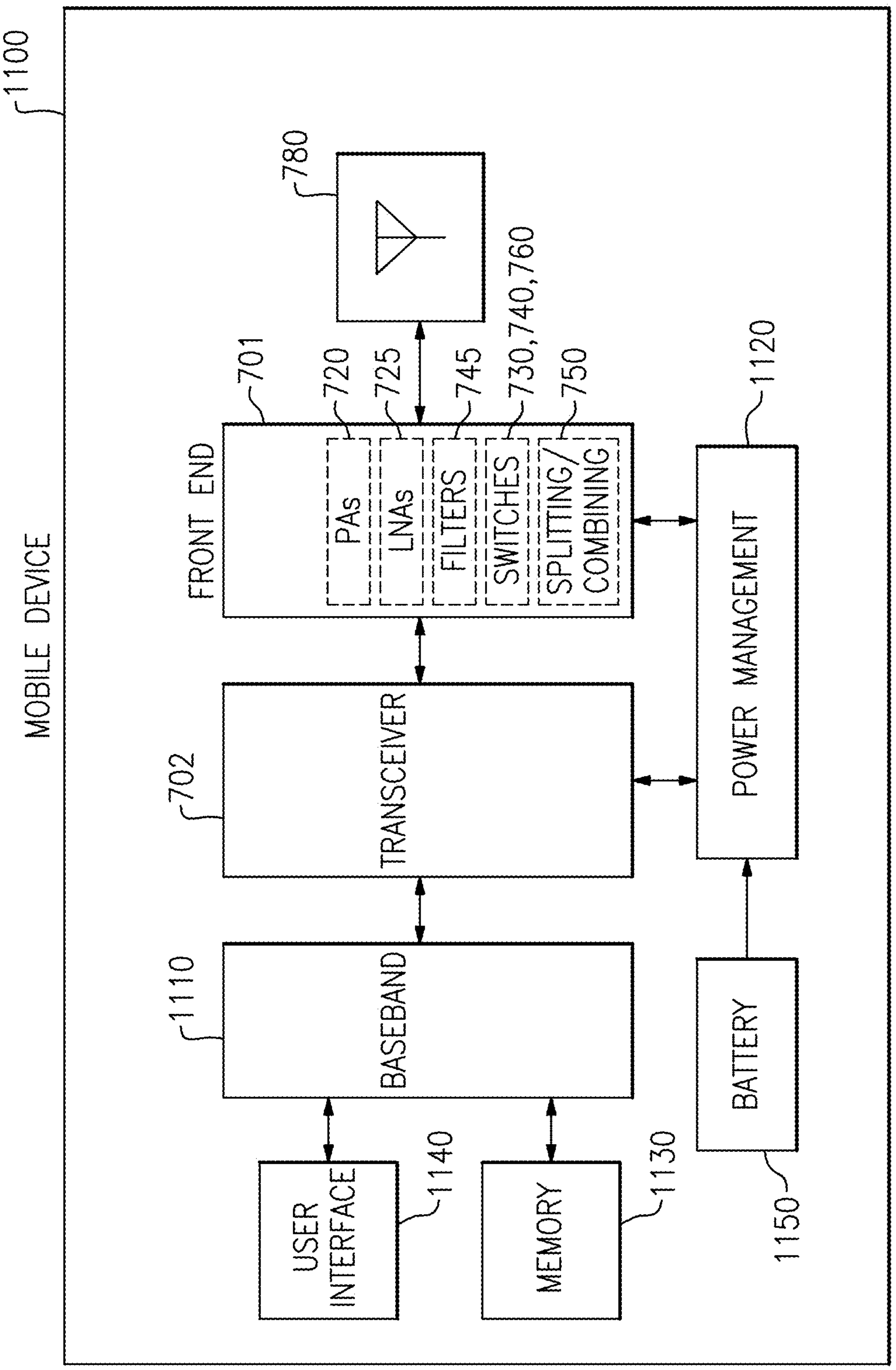
FIG. 11 is a schematic diagram of one embodiment of a mobile device that can incorporate a front-end module, e.g., of FIGS. 7A-7D.

FIG. 11 is a schematic diagram of one embodiment of a mobile device 1100 implementing the front end architecture as described here. The mobile device 1100 includes a front-end module 701, a transceiver 702, a first antenna 780, a baseband system 1110, a power management system 1120, a memory 1130, a user interface 1140, and a battery 1150.

The mobile device 1100 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), WMAN (for instance, WiMax), and/or GPS technologies.

The transceiver 702 can be a radio frequency integrated circuit that generates RF signals for transmission and processes incoming RF signals received from one or more antennas, including the first antenna 780. It will be understood that various functionalities associated with the transmission and receiving of RF signals can be achieved by one or more components that are collectively represented in FIG. 11 as the transceiver 702. In one example, separate components (for instance, separate circuits or dies) can be provided for handling certain types of RF signals.

The RF FEM 701 aids in conditioning signals transmitted to and/or received from the first antenna 780 as discussed herein with reference to FIGS. 5-10. In the illustrated embodiment, the RF FEM 701 includes one or more power amplifiers (PAS) 720, low noise amplifiers (LNAs) 725, filters 745, switches (including the various switches 730*a/b*, 740*a/b*, and 760 as illustrated in FIG. 7), and signal splitting/combining circuitry (such as the duplexer 750). However, other implementations are possible.

For example, the RF FEM 701 can provide a number of functionalities, including, but not limited to, amplifying signals for transmission, amplifying received signals, filtering signals, switching between different bands, switching between different power modes, switching between transmission and receiving modes, duplexing of signals, multiplexing of signals, or some combination thereof.

In certain implementations, the mobile device 1100 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antenna 780 can include one or more antennas used for a wide variety of types of communications. For example, the first antenna 780 can include an antenna for transmitting and/or receiving signals associated with a wide variety of frequencies and communications standards.

In certain implementations, a plurality of antennas can support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, the antenna switch 760 can be used to select a particular antenna from the plurality of antennas based on a variety of factors, such as an observed bit error rate and/or a signal strength indicator.

The mobile device 1100 can operate with beamforming in certain implementations. For example, the RF FEM 701 can include amplifiers having controllable gain and phase shifters having controllable phase to provide beam formation and directivity for transmission and/or reception of signals using the antennas. For example, in the context of signal transmission, the amplitude and phases of the transmit signals provided to each of the plurality of antennas are controlled such that radiated signals combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas from a particular direction. In certain implementations, the first antenna 780 can include one or more arrays of antenna elements to enhance beamforming.

The baseband system 1110 is coupled to the user interface 1140 to facilitate processing of various user input and output (I/O), such as voice and data. The baseband system 1110 provides the transceiver 702 with digital representations of transmit signals, which the transceiver 702 processes to generate RF signals for transmission. The baseband system 1110 also processes digital representations of received signals provided by the transceiver 702. As shown in FIG. 11, the baseband system 1110 is coupled to the memory 1130 to facilitate operation of the mobile device 1100.

The memory 1130 can be used for a wide variety of purposes, such as storing data and/or instructions to facilitate the operation of the mobile device 1100 and/or to provide storage of user information.

The power management system 1120 provides a number of power management functions of the mobile device 1100. In certain implementations, the power management system 1120 includes a PA supply control circuit that controls a supply voltage of each of the power amplifiers 720/725. For example, the power management system 1120 can be configured to change the supply voltage(s) provided to one or more of the power amplifiers 720 to improve efficiency, such as power added efficiency (PAE). The power management system 1120 can include PMUs implemented in accordance with the teachings herein. Thus, the power management system 1120 can be implemented in accordance with any of the embodiments herein, and serves as a power management sub-system for UE.

As shown in FIG. 11, the power management system 1120 receives a battery voltage from the battery 1150. The battery 1150 can be any suitable battery for use in the mobile device 1100, including, for example, a lithium-ion battery.

Figure 12A:
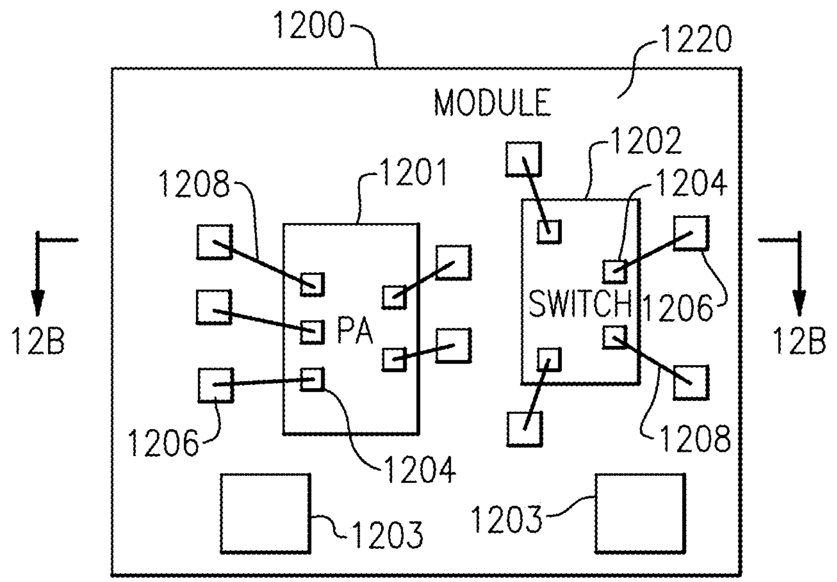
FIG. 12A is a schematic diagram of one embodiment of a packaged module that can incorporate a front-end module, e.g., of FIGS. 7A-7D.
Figure 12B:
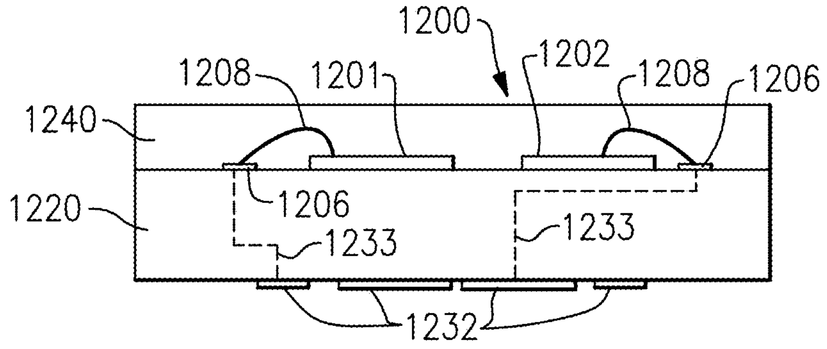
FIG. 12B is a schematic diagram of a cross-section of the packaged module of FIG. 12A taken along the lines 12B-12B.

FIG. 12A is a schematic diagram of one embodiment of a packaged module 1200, and can implement any of the modules described herein, including those shown and described with respect to FIGS. 5-7. FIG. 12B is a schematic diagram of a cross-section of the packaged module 1200 of FIG. 12A taken along the lines 12B-12B.

The packaged module 1200 includes a power amplifier die 1201, a supply switch die 1202, surface mount components 1203, wirebonds 1208, a package substrate 1220, and encapsulation structure 1240. The package substrate 1220 includes pads 1206 formed from conductors disposed therein. Additionally, the dies 1201, 1202 include pads 1204, and the wirebonds 1208 have been used to connect the pads 1204 of the dies 1201, 1202 to the pads 1206 of the package substrate 1220.

The power amplifier die 1201 and the supply switch die 1202 are implemented in accordance with one or more features of the present disclosure. In certain implementations, the supply switch die 1202 provides a selected power amplifier supply voltage to the power amplifier die 1201.

In certain implementations, the dies 1201, 1202 are manufactured using different processing technologies. In one example, the power amplifier die 1201 is manufactured using a heterojunction bipolar transistor (HBT) process, and the supply switch die 1202 is manufactured using a silicon process.

The packaging substrate 1220 can be configured to receive a plurality of components such as the dies 1201, 1202 and the surface mount components 1203, which can include, for example, surface mount capacitors and/or inductors.

As shown in FIG. 12B, the packaged module 1200 is shown to include a plurality of contact pads 1232 disposed on the side of the packaged module 1200 opposite the side used to mount the dies 1201, 1202. Configuring the packaged module 1200 in this manner can aid in connecting the packaged module 1200 to a circuit board such as a phone board of a wireless device. The example contact pads 1232 can be configured to provide RF signals, bias signals, power low voltage(s) and/or power high voltage(s) to the dies 1201, 1202 and/or the surface mount components 1203. As shown in FIG. 12B, the electrically connections between the contact pads 1232 and the die 1201 can be facilitated by connections 1233 through the package substrate 1220. The connections 1233 can represent electrical paths formed through the package substrate 1220, such as connections associated with vias and conductors of a multilayer laminated package substrate.

In some embodiments, the packaged module 1200 can also include one or more packaging structures to, for example, provide protection and/or facilitate handling of the packaged module 1200. Such a packaging structure can include overmold or encapsulation structure 1240 formed over the packaging substrate 1220 and the components and die(s) disposed thereon.

It will be understood that although the packaged module 1200 is described in the context of electrical connections based on wirebonds, one or more features of the present disclosure can also be implemented in other packaging configurations, including, for example, flip chip configurations.

Applications

Some of the embodiments described above have provided examples in connection with mobile devices. However, the principles and advantages of the embodiments can be used for any other systems or apparatus that have needs for UHB architectures. Examples of such RF communication systems include, but are not limited to, mobile phones, tablets, base stations, network access points, customer-premises equipment (CPE), laptops, and wearable electronics.

CONCLUSION

Unless the context clearly requires otherwise, throughout the description and the claims, the words “comprise,” “comprising,” and the like are to be construed in an inclusive sense, as opposed to an exclusive or exhaustive sense; that is to say, in the sense of “including, but not limited to.” The word “coupled”, as generally used herein, refers to two or more elements that may be either directly connected, or connected by way of one or more intermediate elements. Likewise, the word “connected”, as generally used herein, refers to two or more elements that may be either directly connected, or connected by way of one or more intermediate elements. Additionally, the words “herein,” “above,” “below,” and words of similar import, when used in this application, shall refer to this application as a whole and not to any particular portions of this application. Where the context permits, words in the above Detailed Description using the singular or plural number may also include the plural or singular number respectively. The word “or” in reference to a list of two or more items, that word covers all of the following interpretations of the word: any of the items in the list, all of the items in the list, and any combination of the items in the list.

Moreover, conditional language used herein, such as, among others, “may,” “could,” “might,” “can,” “e.g.,” “for example,” “such as” and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency front-end system comprising:

a duplexer including a receive filter configured to filter a receive signal received by an antenna to pass a receive channel of a frequency division duplex band and output a filtered receive signal, and the duplexer further including a transmit filter configured to filter an amplified transmit signal for transmission via the antenna to pass a transmit channel of the frequency division duplex band, the duplexer including a common antenna-side port that receives the receive signal and outputs the filtered amplified transmit signal;

a receive amplifier including a first amplified output, a second amplified output, and a common amplifying transistor, the common amplifying transistor configured to amplify the filtered receive signal to generate an amplified receive signal and to provide the amplified receive signal on the first amplified output of the receive amplifier and a second amplified output of the receive amplifier;

a first noise filter connected to the first amplified output, having a stopband corresponding to the transmit channel, and configured to output a filtered receive signal, the first noise filter reducing intermodulation distortion from transmit leakage; and a switch configured to selectively output either the filtered receive signal or the second amplified output.

2. The radio frequency front-end system of claim 1 wherein the receive amplifier further includes a second transistor connected between the common amplifying transistor and the first amplified output, and a third transistor connected between the common amplifying transistor and the second amplified output.

3. The radio frequency front-end system of claim 2 wherein the second transistor is biased by a first voltage and the third transistor is biased by a second voltage.

4. The radio frequency front-end system of claim 1 wherein the switch is a single-throw, multi-pole switch.

5. The radio frequency front-end system of claim 1 wherein the first noise filter is a notch filter.

6. The radio frequency front-end system of claim 1 wherein the first noise filter is a bulk acoustic wave (BAW) filter, a surface acoustic wave (SAW) filter, a Temperature-compensated SAW (TC-SAW) filter, or an advanced thin-film TC-SAW filter to provide at least 30 dB of noise rejection.

7. The radio frequency front-end system of claim 1 wherein the first noise filter is a dual-mode surface acoustic wave filter.

8. The radio frequency front-end system of claim 1 wherein an output of the switch is coupled to an input port of a radio frequency integrated circuit.

9. The radio frequency front-end system of claim 8 wherein the radio frequency front-end system is implemented in a packaged module, and the radio frequency integrated circuit implements a transceiver.

10. The radio frequency front-end system of claim 1 wherein the receive amplifier includes a third amplified output, the front-end system further comprises a second noise filter connected to the third amplified output and configured to output a second filtered receive signal, and the switch configured to selectively output either the filtered receive signal, the second filtered receive signal, or the second amplified output.

11. The radio frequency front-end system of claim 10 wherein the second noise filter has a stop band corresponding to a transmit channel of a second frequency duplex band.

12. A mobile device comprising:

an antenna;

a radio frequency integrated circuit; and a radio frequency module including a duplexer, a receive amplifier, a first noise filter, and a switch, the duplexer including a receive filter configured to filter a receive signal received by an antenna to pass a receive channel of a frequency division duplex band and output a filtered receive signal, and the duplexer further including a transmit filter configured to filter an amplified transmit signal for transmission via the antenna to pass a transmit channel of the frequency division duplex band, the duplexer including a common antenna-side port that receives the receive signal and outputs the filtered amplified transmit signal, the receive amplifier including a first amplified output, a second amplified output, and a common amplifying transistor, the common amplifying transistor configured to amplify the filtered receive signal to output an amplified receive signal and to provide the amplified receive signal on the first amplified output of the receive amplifier and a second amplified output of the receive amplifier, the first noise filter connected to the first amplified output, having a stopband corresponding to the transmit channel, and configured to output a filtered receive signal, the first noise filter reducing intermodulation distortion from transmit leakage, and the switch configured to selectively output either the filtered receive signal or the second amplified output.

13. The mobile device of claim 12 wherein the receive amplifier further includes a second transistor connected between the common amplifying transistor and the first amplified output of the receive amplifier, and a third transistor connected between the common amplifying transistor and the second amplified output of the receive amplifier.

14. The mobile device of claim 13 wherein the second transistor is biased by a first voltage and the third transistor is biased by a second voltage.

15. The mobile device of claim 13 wherein an output of the switch is coupled to an input port of a radio frequency integrated circuit, the radio frequency module is implemented in a packaged module, and the radio frequency integrated circuit implements a transceiver.

16. The mobile device of claim 13 further comprising a transmit power amplifier configured to amplify a radio frequency transmit signal to generate the amplified transmit signal.

17. The mobile device of claim 13 wherein the receive amplifier includes a third amplified output, radio frequency module further comprises a second noise filter connected to the third amplified output and configured to output a second filtered receive signal, and the switch configured to selectively output either the filtered receive signal, the second filtered receive signal, or the second amplified output.

18. The mobile device of claim 12 wherein the first noise filter is a notch filter.

19. The mobile device of claim 12 wherein the first noise filter is a bulk acoustic wave (BAW) filter, a surface acoustic wave (SAW) filter, a Temperature-compensated SAW (TC-SAW) filter, or an advanced thin-film TC-SAW filter to provide at least 30 dB of noise rejection.

20. A mobile device comprising:

an antenna;

a transceiver; and a front end including a duplexer, a receive amplifier, a first noise filter, and a switch, the duplexer including uplink and downlink filters, the downlink filter configured to filter a receive signal received by an antenna and having a passband corresponding to a receive channel of a frequency division duplex communication band, the uplink filter configured to filter an amplified transmit signal for transmission via the antenna and having a passband corresponding to a transmit channel of the frequency division duplex communication band, the duplexer including a common antenna-side port that receives the receive signal and outputs the filtered amplified transmit signal, the receive amplifier including a first amplified output, a second amplified output, and a common amplifying transistor, the common amplifying transistor configured to amplify the filtered receive signal output by the downlink filter to generate an amplified receive signal, and to provide the amplified receive signal on the first amplified output of the receive amplifier and a second amplified output of the receive amplifier, the first noise filter connected to the first amplified output, having a stopband corresponding to the transmit channel, and configured to output a filtered receive signal, the first noise filter reducing intermodulation distortion from transmit leakage, and the switch configured to selectively output either the filtered receive signal or the second amplified output.

* * * * *